DIGITAL RECEIVER TUNING SYSTEM

Filed Dec. 4, 1963 10 Sheets-Sheet 1

INVENTORS
JAMES T. KELLIS
ROBERT W. PARGEE
BY Harry R. Lubcke
AGENT

Dec. 29, 1964 J. T. KELLIS ETAL 3,163,823
DIGITAL RECEIVER TUNING SYSTEM
Filed Dec. 4, 1963 10 Sheets-Sheet 2

INVENTORS
JAMES T. KELLIS
ROBERT W. PARGEE
BY Harry R. Lubcke
AGENT

DIGITAL RECEIVER TUNING SYSTEM

Filed Dec. 4, 1963 10 Sheets-Sheet 3

INVENTORS
JAMES T. KELLIS
ROBERT W. PARGEE
BY Harry R. Lubcke
AGENT

INVENTORS
JAMES T. KELLIS
ROBERT W. PARGEE
BY
Harry R. Lubcke
AGENT

INVENTORS
JAMES T. KELLIS
ROBERT W. PARGEE
BY Harry R. Lubcke
AGENT

Dec. 29, 1964 J. T. KELLIS ETAL 3,163,823

DIGITAL RECEIVER TUNING SYSTEM

Filed Dec. 4, 1963 10 Sheets-Sheet 6

INVENTORS
JAMES T. KELLIS
ROBERT W. PARGEE

BY Harry R. Lubcke
AGENT

INVENTORS
JAMES T. KELLIS
ROBERT W. PARGEE
BY
Harry R. Lubcke
AGENT

INVENTORS
JAMES T. KELLIS
ROBERT W. PARGEE
BY Harry R. Lubcke
AGENT

| DIAL INDICATOR | ELECTRICAL OUTPUT | | | | | | | | |
|---|---|---|---|---|---|---|---|---|---|
| | COM | 1 | 2 | 4 | 8 | $\bar{1}$ | $\bar{2}$ | $\bar{4}$ | $\bar{8}$ |
| 0 | ● | ● | | | ● | | ● | ● | |
| 1 | ● | | | | ● | ● | ● | ● | |
| 2 | ● | ● | ● | ● | | | | | ● |
| 3 | ● | | ● | ● | | ● | | | ● |
| 4 | ● | ● | | ● | | | ● | | ● |
| 5 | ● | | | ● | | ● | ● | | ● |
| 6 | ● | ● | ● | | | | | ● | ● |
| 7 | ● | | ● | | | ● | | ● | ● |
| 8 | ● | ● | | | | | ● | ● | ● |
| 9 | ● | | | | | ● | ● | ● | ● |

● INDICATES CLOSURE OF A SWITCH IN THE GROUP 526 THROUGH 533

INVENTORS
JAMES T. KELLIS
ROBERT W. PARGEE
BY Harry R. Lubcke
AGENT

INVENTORS
JAMES T. KELLIS
ROBERT W. PARGEE
BY Harry R. Lubcke
AGENT

United States Patent Office 3,163,823
Patented Dec. 29, 1964

3,163,823
DIGITAL RECEIVER TUNING SYSTEM
James T. Kellis, Tustin, and Robert W. Pargee, San Clemente, Calif., assignors to Electronic Engineering Company of California, Santa Ana, Calif., a corporation of California
Filed Dec. 4, 1963, Ser. No. 328,071
11 Claims. (Cl. 325—421)

Figure 1:
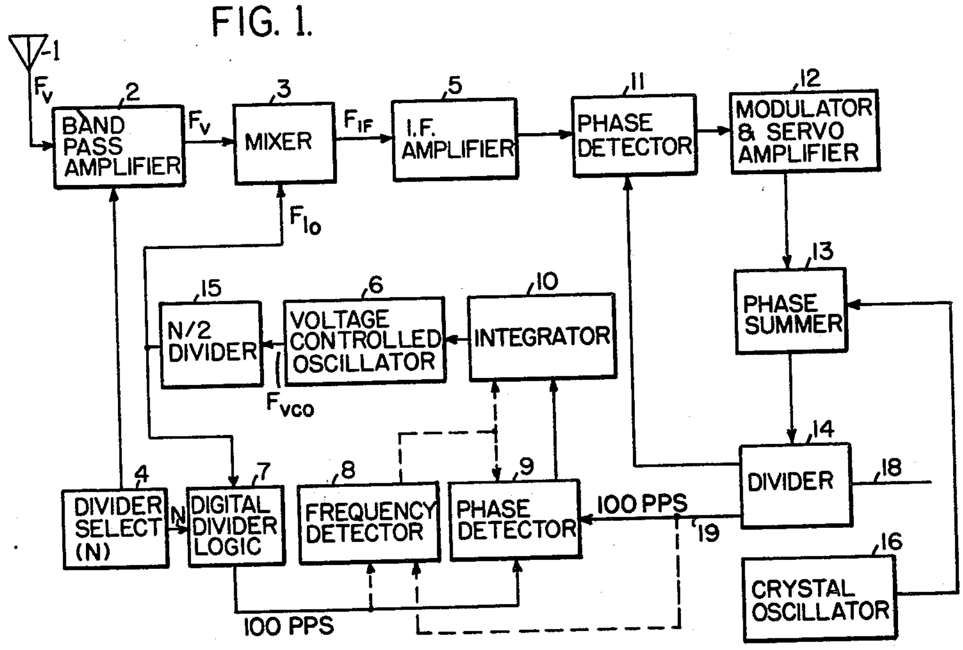

Our invention relates to a radio receiver and particularly to such a receiver in which tuning is accomplished in specific increments under the control of a digital divider.

Nearly all radio-wave receivers for many years have been tuned over a frequency band in a continuous manner by one or more resonant circuits containing inductance and capacitance. Additionally, superheterodyne mixers with non-linear characteristics have combined incoming and local essentially sinusoidal waveshapes of radio frequency energy to obtain the intermediate frequency.

We have departed from these known techniques to obtain certain advantages. In the "very low frequency" (VLF) band, for example, extending from perhaps 12 to 30 kilocycles, the required inductors and capacitors are large, heavy and of low "Q." Such circuits, moreover, are subject to drift of resonant frequency with changes in temperature, humidity and other similar factors.

In our receiver the superheterodyne mixer is really not a mixer at all, but is instead a phase-inverting switch. It is provided with alternating electrical energy from a local oscillator, but this is not of the known sinusoidal waveshape; rather, a square waveshape from a bistable multivibrator which is triggered by a voltage-controlled oscillator of the relaxation type. With the aid of a center-tapped transformer secondary and transistor switching an intermediate frequency output is obtained. Each successive half cycle of the local oscillator square wave inverts the incoming radio wave energy; i.e., causes a 180° phase shift.

The frequency of the voltage-controlled oscillator is maintained to a very small fraction of one cycle; actually, it is phase-locked, by a servo loop which includes digital divider logic. This system divides the voltage-controlled oscillator frequency by a number "N," which number is always an integer. The result of such division is a pulse waveform having 100 pulses per second, in a typical embodiment. This waveform is compared in phase with a locally generated pulse waveform of the same frequency by a digital comparator switch. The analog value (amplitude) of the pulses are of no concern. The phase comparison is made with respect to the timing of the pulses. The frequency of the voltage-controlled oscillator is altered by the servo system until both waveforms of 100 pulses per second are of exactly the same frequency and are coincident in time. This phase-locks the system.

Because a voltage-controlled oscillator is employed in a servo loop, it is possible to tune away from a given transmitted signal and, upon returning to it, to hold the same phase relationship. This is not so with a receiver of the art which employs reactive (LC) tuning, where the retuning cannot be exact enough to duplicate the phase relation from one time to the next with any given transmitter.

By employing digital logic tuning means for the tuning system it is also possible to employ thumbwheel digital contact switches in decade connection, so that the radio frequency to which the receiver is tuned may be selected by such switches aligned one next to the other on a front panel so as to read directly in frequency. By means of detents on the switches the tuning procedure is reduced to merely dialing the frequency desired.

Also, we employ plural band pass filters having adjacent frequency ranges in the first stages of the receiver to attenuate the image response of the superheterodyne type of receiver. These are not plugged-in according to the frequency range in which the desired station is located, but the appropriate one is automatically switched in circuit by solid state circuitry, which circuitry is controlled by contacts on the thumbwheel switches. This automatic modification of our method and apparatus coacts efficiently with our basic mode of operation and apparatus structure.

In an alternate embodiment the frequency produced to be locked-in-phase is digitally multiplied by "N" instead of digitally divided.

Although only a phase comparator is required to accomplish the basic functioning of our receiver in synchronizing the voltage-controlled oscillator with the locally generated reference, we also prefer to include a frequency detector. Because the phase-locked loop is limited in response to large error rates between the divided voltage-controlled oscillator signal and the phase comparator reference, it is necessary that the voltage-controlled oscillator be near the correct frequency to permit phase locking. This function is performed by automatic-frequency-control circuitry, which coarsely adjusts the frequency of the voltage-controlled oscillator so that the frequency error is within that acceptable to the phase-locking loop and phase locking can be accomplished.

The function of the frequency detector can be accomplished manually by an operator. However, our complete receiver is suited for unattended operation at an inaccessible location. It may be pre-programmed to switch back and forth from one transmitter to another in a phase-coherent manner. This type of operation is valuable for precise determination of time at remote stations and for radio navigation and the like.

While very low frequency (VLF) range of tuning has been mentioned and is an important application for the receiver, the same principles and equivalent apparatus may be employed for reception almost anywhere in the radio frequency spectrum.

An object of our invention is to provide a radio receiver devoid of adjustable inductance-capacitance tuning circuits which resonate to the frequency being received.

Another object is to operate a superheterodyne type radio receiver with a square wave local oscillator.

Another object is to operate a superheterodyne type radio receiver with a phase-inverting switch as a first mixer.

Another object is to provide a receiver having digital means for accomplishing tuning through a phase and frequency sensitive voltage-controlled oscillator servo loop.

Another object is to employ thumbwheel digital contact switches in conjunction with the servo means of this type of receiver.

Another object is to provide a constant phase of the local oscillator upon changing from one frequency to another and back again.

Another object is to provide a very low frequency receiver having automatic means for accomplishing first a frequency and then a phase lock upon the carrier of a very low frequency transmitter.

Another object is to provide a receiver in which an appropriate band pass filter is switched into the input of the receiver by the same means which selects the particular transmitter station to be received.

Other objects will become apparent upon reading the following detailed specification and upon examining the accompanying drawings, in which are set forth by way of illustration and example certain embodiments of our invention.

Figure 2:
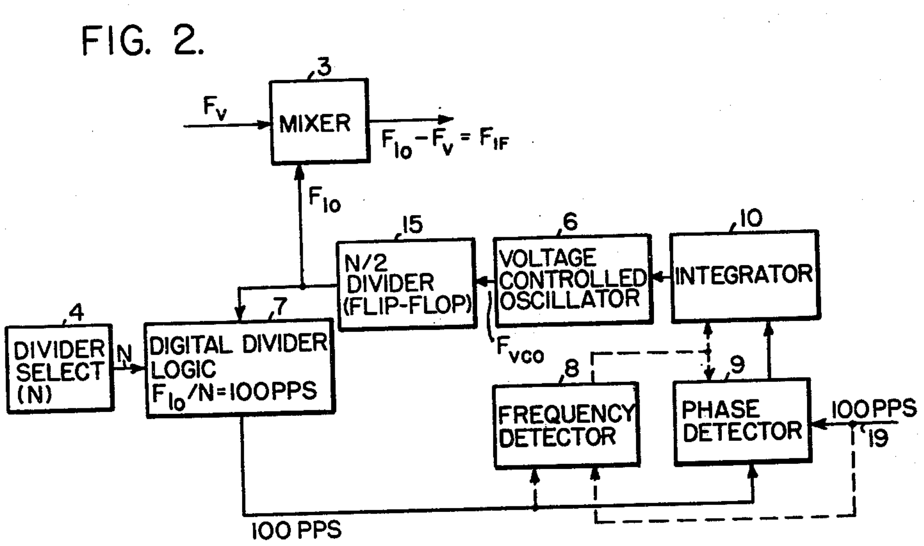
Figure 3:
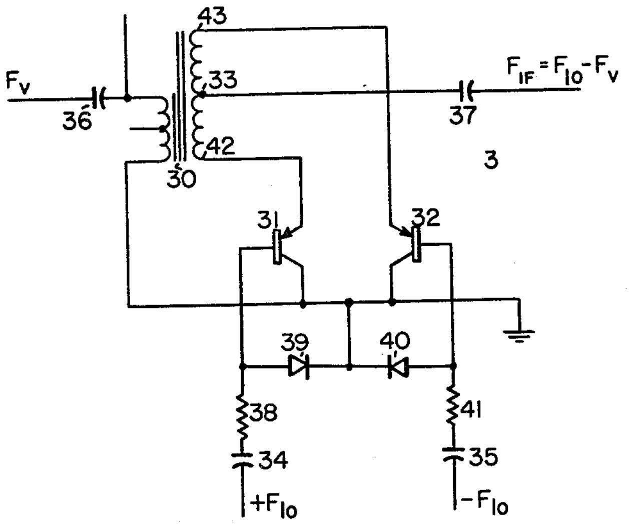
Figure 4:
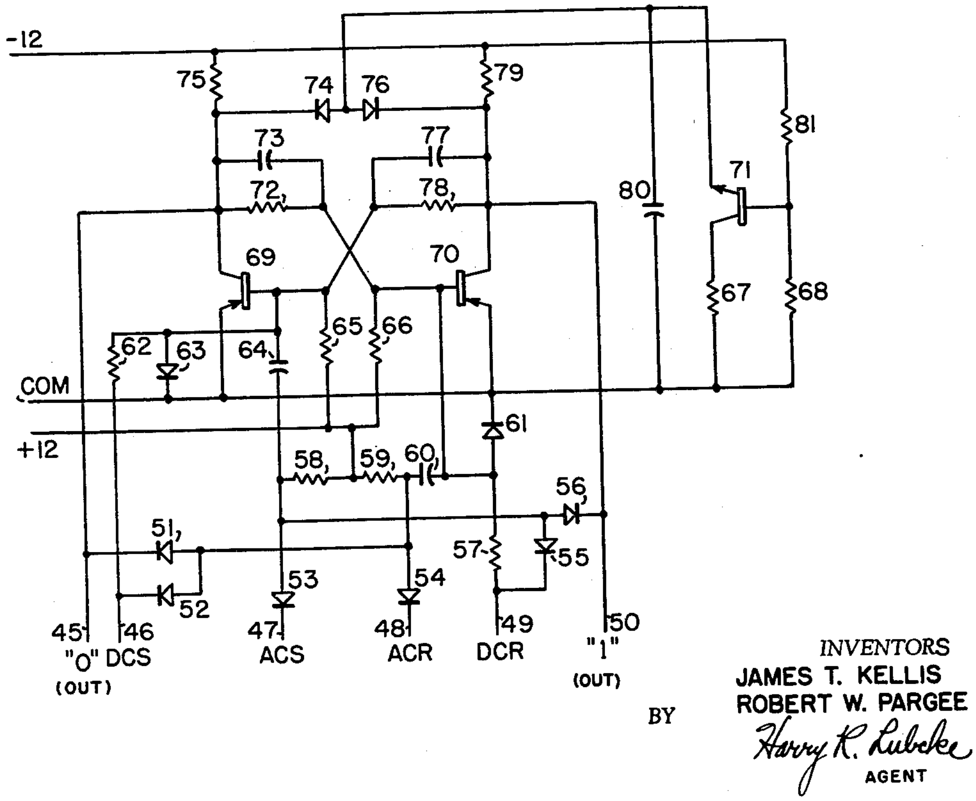
Figure 5:
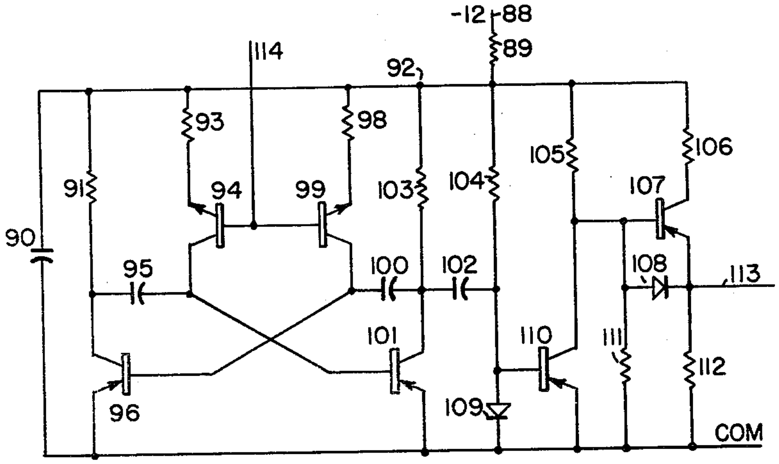
Figure 6:
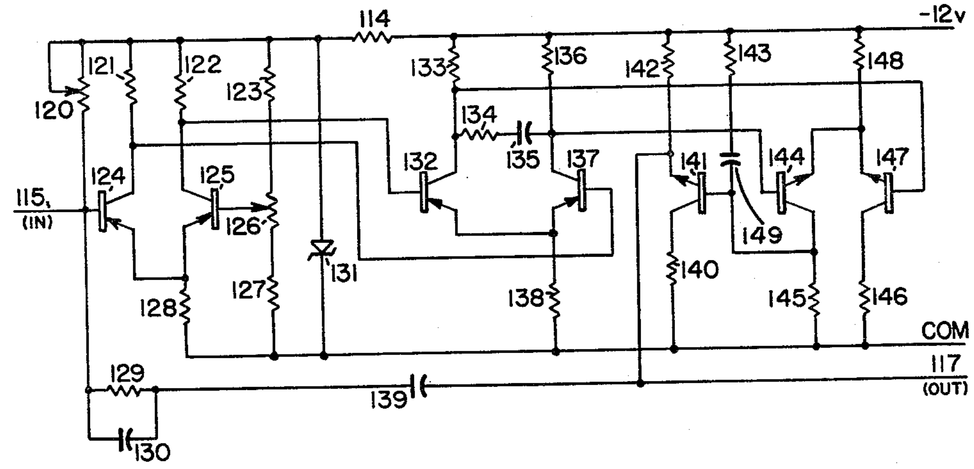
Figure 7:
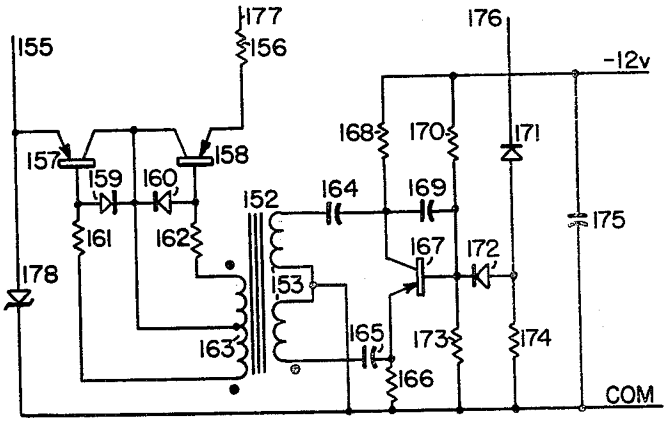
Figure 8:
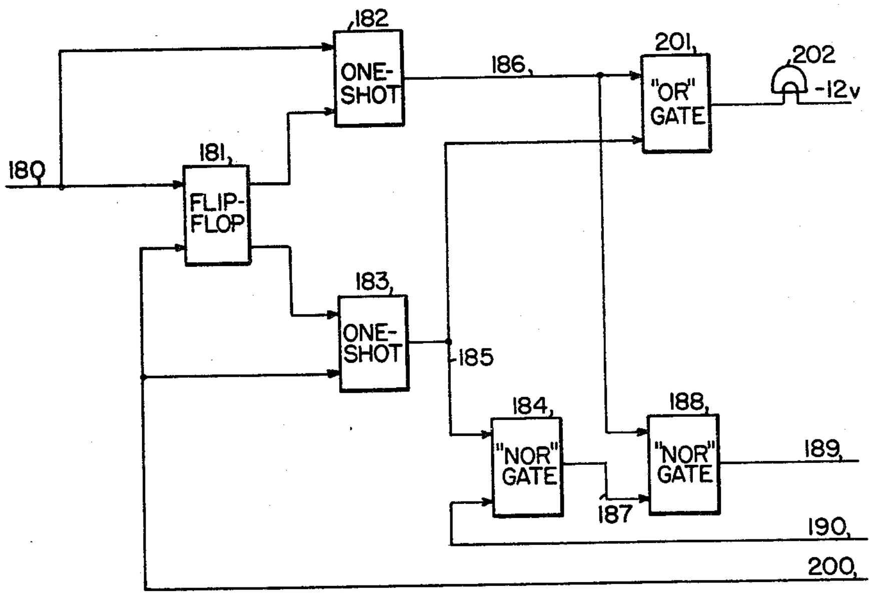
Figure 9:
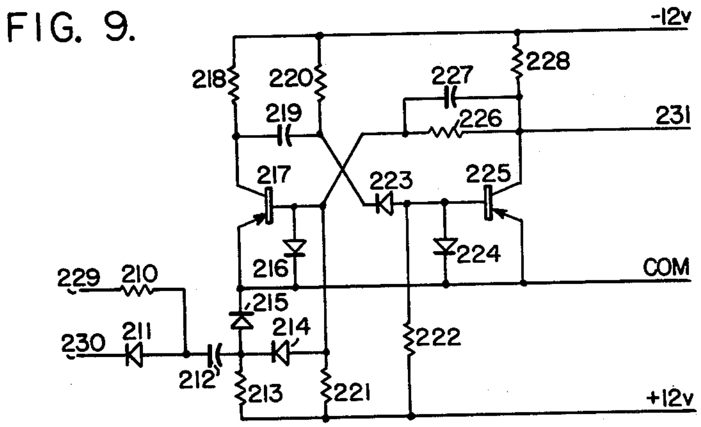
Figure 10:
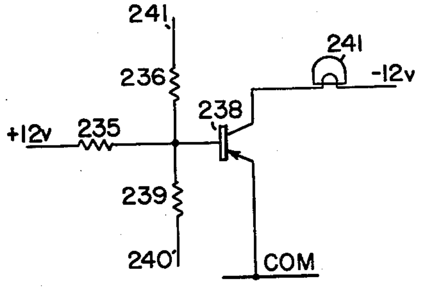
Figure 11:
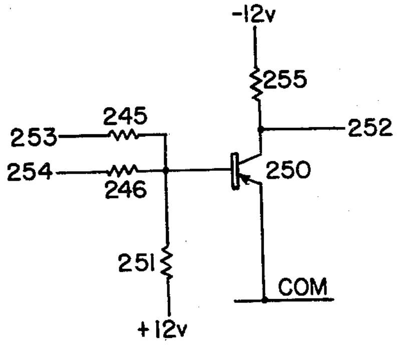
Figure 12:
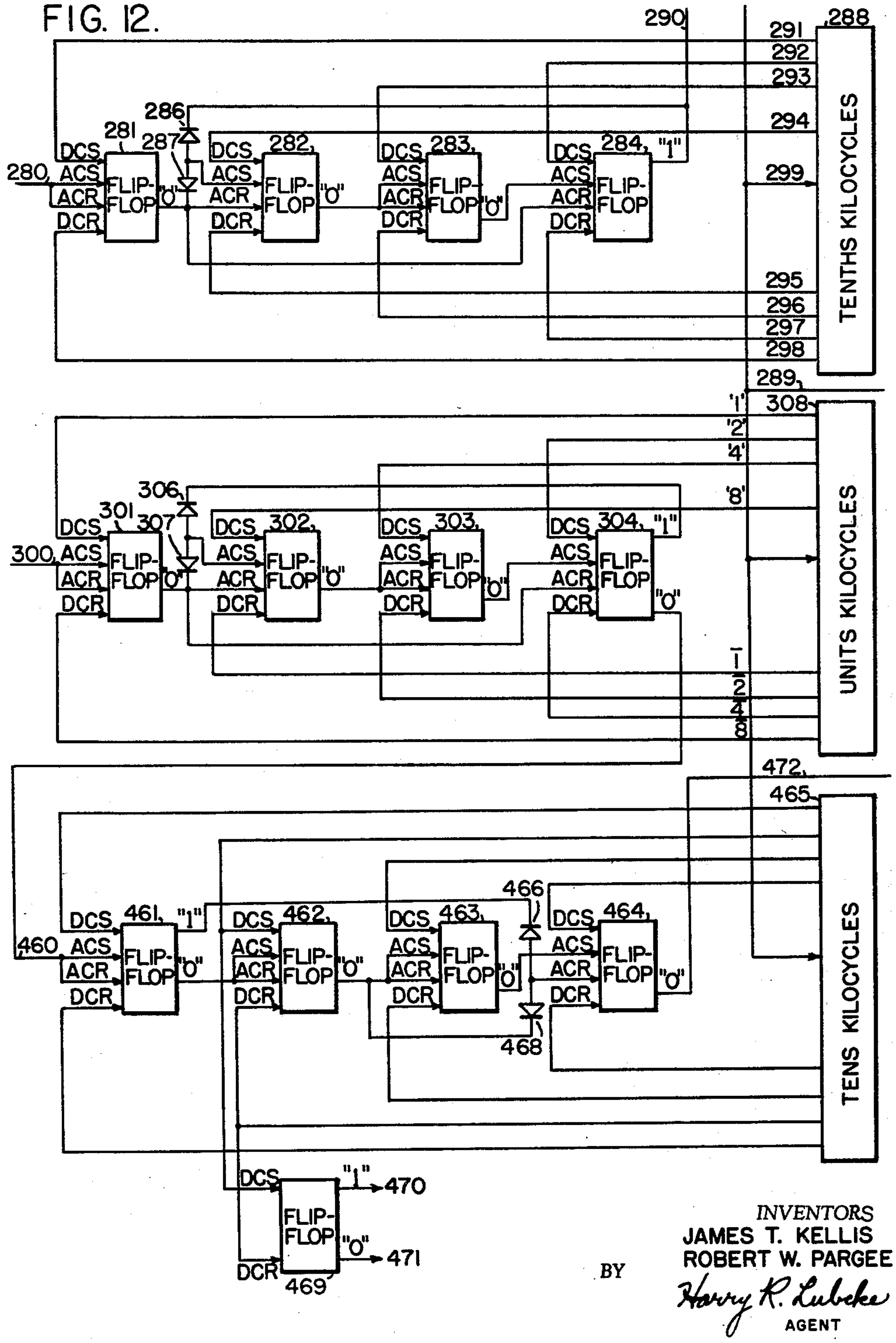
Figure 13:
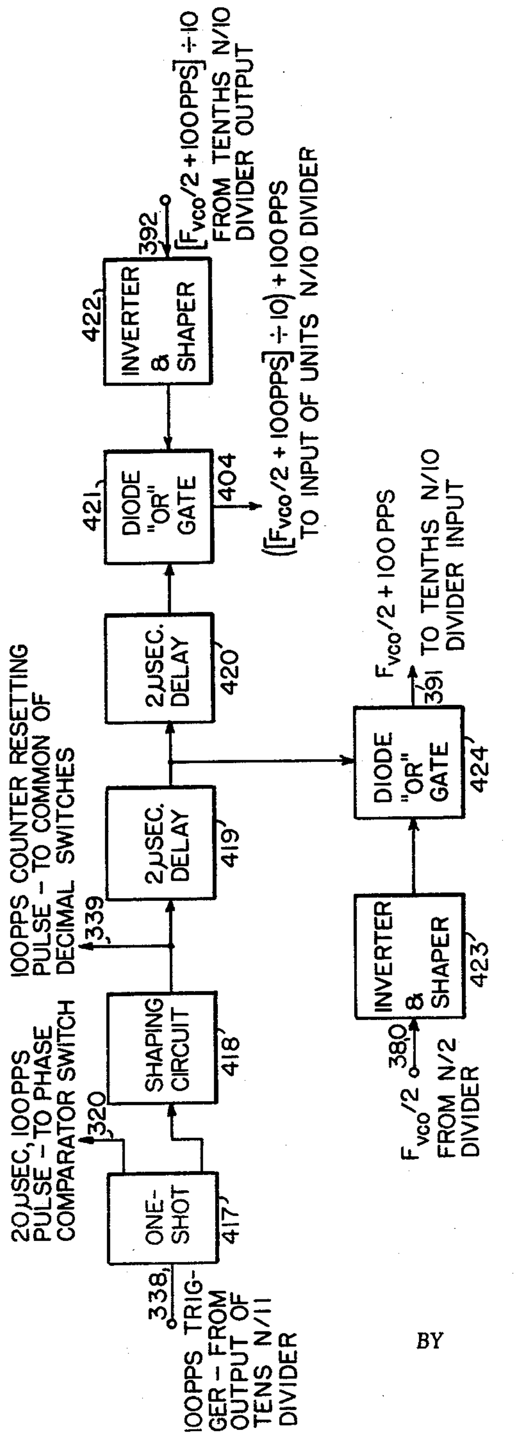
Figure 14:
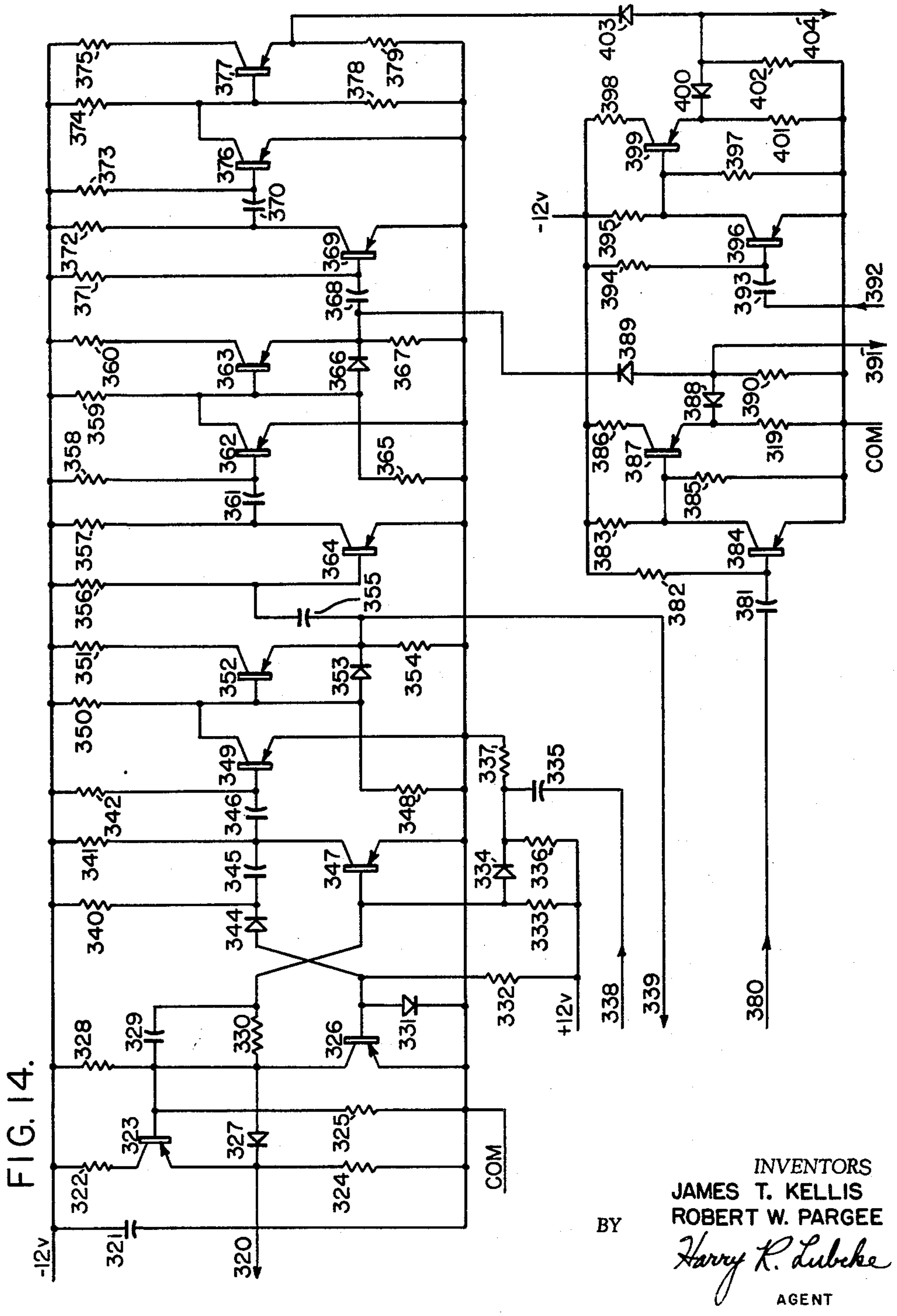
Figures 15, 16:
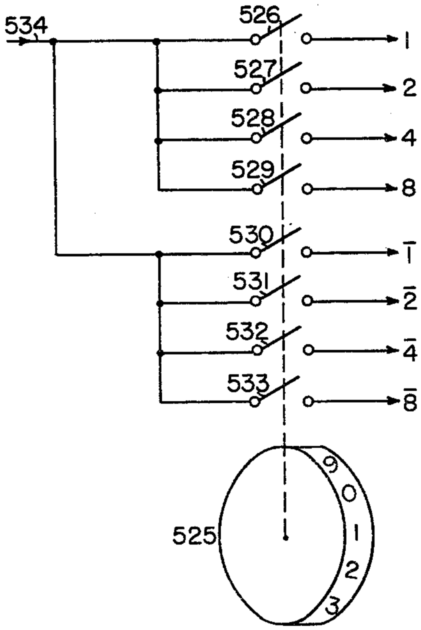
Figure 17:
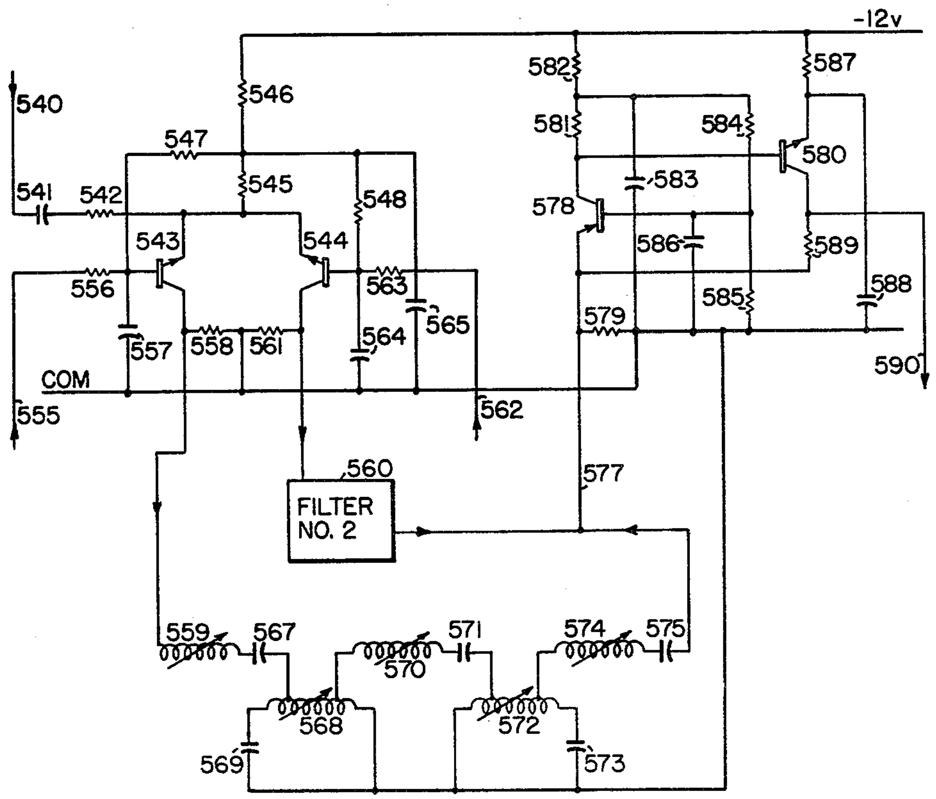

FIG. 1 is a block diagram of the receiver,

FIG. 2 is a block diagram of the voltage-controlled oscillator, digital divider logic, frequency control and phase control coactive with the voltage-controlled oscillator, FIG. 3 is the schematic diagram of the mixer (of FIG. 1), FIG. 4 is the schematic diagram of an $N/2$ frequency divider, or flip-flop, employed at various places in the receiver circuit, including to reduce the frequency of the voltage-controlled oscillator and to produce a symmetrical waveshape for subsequent use in the receiver, FIG. 5 is a schematic diagram of the voltage-controlled oscillator, FIG. 6 is the schematic diagram of the integrator, or integrating amplifier, which supplies a controlling voltage to the voltage-controlled oscillator, FIG. 7 is a schematic diagram of the phase detector, FIG. 8 is the block diagram of the frequency detector, which is composed of several computer-type elements, FIG. 9 is the schematic diagram of a typical one-shot multivibrator for use in the frequency detector, FIG. 10 is the schematic diagram of a typical OR gate for use in the frequency detector, FIG. 11 is the schematic diagram of a typical NOR gate for use in the frequency detector, FIG. 12 is a block diagram of a chain of frequency dividers suited for the kilocycle decades of the digital divider logic of FIG. 1, FIG. 13 is a block diagram of one-shot and divider logic used to control the above digital divider, FIG. 14 is the schematic diagram of the same, FIG. 15 is the circuit of a typical thumbwheel switch, of which three are used in a typical embodiment; one each for "tenths," "units" and "tens" decades, FIG. 16 is a table of typical contacts made by a digital thumbwheel switch for the ten different positions in which it can be set, and FIG. 17 is the schematic diagram of the band-pass filter amplifier 2 of FIG. 1.

In FIG. 1 numeral 1 indicates a receiving antenna. For the illustrative example herein considered of a very low frequency receiver this may be of the whip, loop or long wire type. It is required to collect sufficient radio frequency energy to properly operate the receiver, which may be as low as 0.05 microvolt at the input terminals of the receiver.

The radio wave signals picked up by antenna 1 are applied to the input of bandpass amplifier 2, which amplifies signals in the 12 to 20 kilocycle (kc.) band or in the 20 to 30 kc. band under the selective control of divider select 4. The amplified signals, of frequency $F_v$, from the output of bandpass amplifier 2 are applied to the signal input of mixer 3.

A locally generated reference frequency $F_{lo}$, which is higher in frequency than the signal to be selectively amplified by an amount equal to the intermediate amplifier frequency, say 9 kc., is supplied from voltage-controlled oscillator 6 through $N/2$ frequency divider 15 to the reference input of mixer 3. One of the outputs of mixer 3 is the signal $F_{IF}=F_{lo}-F_v$, and this is the useful one for reception.

Intermediate frequency (IF) amplifier 5 amplifies a narrow band of signal frequencies at $F_{IF}=9$ kc.+50 cycles per second. Thus, any frequency lying within the previously selected band of 12 to 20 or 20 to 30 kc. is selected for further amplification by applying to mixer 3 a local oscillator frequency $F_{lo}$ that is 9 kc. higher than the desired signal frequency.

The reference frequency $F_{lo}$ that is generated by the voltage-controlled oscillator 6 and frequency divider 15 is controlled by the several elements; divider select 4, digital divider logic 7, frequency detector 8, phase detector 9 and integrator 10. Setting the divider select unit 4 to a number corresponding to the frequency to be selectively amplified causes the digital divider logic 7 to be divided by a number equal to the desired frequency in tenths of kilocycles plus 90 tenths of a kilocycle. Thus, for a desired frequency of 15 kc., the digital divider logic divides by $(15\times10)+90=240$.

The frequency of the voltage-controlled oscillator divided by two, $(F_{vco}/2)$ is equal to $F_{lo}$. This frequency, divided by 240, is compared against a precision 100 cycle per second frequency that is externally generated as to both frequency and phase differences. If this $F_{vco}/480$ frequency differs from 100 cycles per second (c.p.s.), then the frequency detector 8, acting through integrator 10, increases or decreases the frequency of voltage-controlled oscilaltor 6 until $F_{vco}/480$ equals 100 c.p.s.

When the frequency error approaches zero, phase detector 9 takes control and increases or decreases the frequency $F_{vco}/480$ for a time period sufficiently long to advance or retard the phase thereof relative to the 100 c.p.s. precision frequency until the phase difference approaches zero.

This establishes the $F_{vco}/2(=F_{lo})$ frequency at 24 kc. Mixer 3 then has a 9 kc. $F_{IF}$ output when a $F_v$ signal of 15 kc. is present at the signal input of the mixer. This 9 kc. output frequency is amplified in I.F. amplifier 5. Since this passes only 9 kc.+50 c.p.s., only the desired frequency is presented to phase detector 11.

Turning now to the schematic diagrams; as shown in FIG. 3, mixer 3 employs two transistor switches 31 and 32. These alternately ground the extremity terminals 42 and 43 of the secondary of transformer 30 at the frequency $F_{lo}$. That is, terminal 42 is grounded while terminal 43 is not, and vice versa. This causes half of any voltage $F_v$ induced into the secondary of transformer 30 to appear at terminal 33, the centertap, as a voltage referenced to ground. This voltage is alternately inverted and not inverted at frequency $F_{lo}$. The signal input $F_v$ is thus alternately multiplied by $+1$ and $-1$, since the primary to secondary ratio of transformer 30 is 1 to 2. One of the products of this multiplication process is the difference frequency $F_{lo}-F_v$, which equals the desired intermediate frequency $F_{IF}$.

It is seen from FIG. 3 that the received signal $F_v$ is introduced through coupling capacitor 36 to the primary of transformer 30, the seconnd terminal of the primary being connected to ground. Because of the relatively low "radio frequency" of the order of 12 to 30 kc., capacitor 36 preferably has a capacitance of the order of 20 microfarads ($\mu$f.) in view of the relatively low impedance of the primary of transformer 30.

The intermediate frequency $F_{IF}$ leaves the mixer via capacitor 37, which may have a capacitance of the order of a half-microfarad in view of the higher impedance circuit to which this feed is made. Transistors 31 and 32 may be of the 2N1027 type, of which the collectors are connected to ground and the emitters to the secondary extremity terminals 42 and 43. Each base of the transistors is fed one polarity of the square wave from the voltage-controlled oscillator and frequency divider to give the frequency $F_{lo}$. This feed is obtained through capacitor 34 and resistor 38 for the transistor 31 base and capacitor 35 and resistor 41 for the transistor 32 base. These capacitors each have a capacitance of 2.2 $\mu$f. and the resistors a resistance of 5,600 ohms. Diodes 39 and 40 are connected from each base to ground and serve to provide a recharging current path for capacitors 34 and 35. These diodes may be of the 1N658 type.

It is easily seen that the above-described mixer, or "first detector," is very much different from the conventional superheterodyne first detector.

The intermediate frequency amplifier 5 of FIG. 1 employs three transistors, which may be of the 2N1305 and 2N1499A types, with three overcoupled resonant circuits to give an amplifier of the flat triple type. Such an intermediate frequency has a relatively constant envelope delay through the passed hand.

Flip-flops, or bistable multivibrators, are employed in several places in our receiver. One place is the *N*/2 divider 15 of FIGS. 1 and 2. Others are the digital divider logic 7 of FIGS. 1 and 2, which are set forth in greater detail in FIG. 12. Each of these employ the circuit of FIG. 4. This is essentially the known Eccles-Jordan flip-flop, which is described as to theory and circuit in the book, "Transistor Circuit Engineering," edited by Richard F. Shea, pp. 324 to 332.

In FIG. 4 the essence of the flip-flop is comprised of the symmetrically connected transistors 69 and 70, which may be of the PNP type, as the 2N1499A. The emitters of each transistor are connected directly to the COM bus, which is an equivalent ground. The collectors of each are connected to the —12 v. bus through resistors 75 and 79, respectively, each having a resistance of 1,200 ohms. The collectors and bases are cross-connected, each by a parallel-connected resistor and capacitor, having a resistance of 8,200 ohms and a capacitance of 22 picofarads (pf.), respectively. These are elements 72 and 73, which are connected to the collector of transistor 69 and elements 77 and 78, which are connected to the collector of transistor 70. Each base is further connected to the +12 v. bus through resistors 65 and 66, respectively, each resistor having a resistance of 56,000 ohms.

Additionally, the collector of transistor 69 is directly connected to the cathode of diode 74, and the collector of transistor 70 is directly connected to the cathode of diode 76; each of these diodes being of the 1N658 type and having their anodes connected together. These anodes connect to the emitter of NPN type transistor 71 and also to capacitor 80, which has a capacitance of 0.025 $\mu$f, and the second terminal of which is connected to the COM bus. The collector of transistor 71 connects to the aforementioned COM bus through resistor 67, of 220 ohms resistance. The base of transistor 71 connects to the junction of resistors 81 and 68. "Junction" as here used refers to the common adjacent connection between the two resistors. Resistors 81 and 68 have equal resistances of 1,200 ohms. In series these connect between the —12 v. and the COM buses. This gives a bias of approximately —6 v. to the base of transistor 71, which transistor acts to clamp the transistor 69 and 70 outputs to —6 v. when either of these transistors are shut off.

The basic outputs from the flip-flop are taken from the collectors of the basic flip-flop transistors; a (digital) "0" output from lead 45, which lead is connected to the collector of transistor 69, and a "1" output taken from lead 50, which lead is connected to the collector of transistor 70.

A further network is shown in the lower part of FIG. 4, which has to do with the set and reset connections to the flip-flop. This is described below.

Connected to the base of transistor 69 are resistor 62, of 8,200 ohms resistance, the anode of diode 63, of 1N277 type, and capacitor 64, of 36 pf. capacitance. The second terminal of resistor 62 connects to lead 46, which is the direct current set (DCS) external lead. The cathode of diode 63 is connected to the COM bus. The second terminal of capacitor 64 connects to the alternating current set (ACS) lead 47 through diode 53, which may be of the 1N658 type, with the anode thereof connected to the capacitor. Also connected to the capacitor 64 second terminal is resistor 58, of 30,000 ohms resistance. The second terminal of this resistance connects to the first terminal of resistor 59, also of 30,000 ohms resistance, and also to the +12 v. bus. The second terminal of resistor 59 connects to capacitor 60, of 36 pf. capacitance, and therethrough to the base of transistor 70. This base also connects to resistor 57, of 8,200 ohms resistance, and therethrough to lead 49, which is the direct current reset (DCR) lead of the flip-flop. The base further connects to the anode of diode 61, of the 1N277 type, the cathode of which connects to the COM bus. Lead 49 connects to the cathode of diode 55, of the 1N658 type, and the anode thereof connects to both the first terminal of resistor 58 and to the anode of diode 56, of the 1N277 type, the cathode of which connects to the "1" lead 50. The junction between resistor 59 and capacitor 60 connects to the anode of diode 54, of the 1N658 type, the cathode of which connects to lead 48, the alternating current reset (ACR) connection. This junction also connects to the anode of diode 51, of the 1N277 type, and to the anode of diode 52, of the 1N658 type. The cathode of the former diode connects to the 45 "0" lead and the cathode of the latter diode connects to the 46 lead.

The designations DCS, ACS, ACR and DCR are clearly shown on the flip-flop blocks of FIG. 12 and these correspond with the above-described identical designations.

The output from the "0" line connects to the $+F_{lo}$ line of FIG. 3 and the output from the "1" line connects to the $-F_{lo}$ line of the same figure in the application of one of these flip-flops in that part of the receiver circuit.

The additional transistor 71 in FIG. 4 is employed in each flip-flop to provide a low impedance at its emitter terminal so that diodes 74 and 76 can conduct current through collector resistors 75 and 79 to securely clamp the negative swing of the transistors 69 and 70 collectors voltages.

The circuit of FIG. 4 functions as a divide-by-two circuit when input lines 47 and 48 are connected to the same trigger source, since the circuit changes state once for each input trigger. Accordingly, output line 45 makes a —6.5 v. to —0.5 v. transition for one input pulse and a —0.5 v. to —6.5 v. transition for the next input pulse. Thus, two input pulses are required for each complete cycle of output voltage change from —6.5 v. to —0.5 v. to —6.5 v., and frequency division by a factor of two is accomplished.

It would be possible to operate voltage-controlled oscillator 6 at the frequency required for the mixing process in mixer 3, but we prefer to generate twice that frequency in the oscillator and to reduce it to the $F_{lo}$ frequency by means of the frequency divider of FIG. 4. The frequency divider gives a symmetrical output for use by the mixer of FIG. 3. That is, the $+F_{lo}$ input line is negative for substantially the same length of time as the $-F_{lo}$ line is negative in the alternating square wave. Also, it is easier from the standpoint of practical apparatus to operate a voltage-controlled oscillator at twice the frequency required for very low frequency radio reception than at that frequency.

In FIG. 4 diodes 61, 63, 74 and 76 all act to clamp electrode and other voltages at specific limits in the flip-flop. Diodes 51, 52 and 54, as do 53, 55 and 56, function in the circuit as logical gates. These either enable or prevent an input from being applied to trigger the circuit.

The voltage-controlled oscillator of FIG. 5 is essentially a free-running astable multivibrator, producing, of course, an essentially square waveshape. Coupling capacitors 95 and 100 are discharged through transistors 94 and 99, which transistors act as voltage-controlled constant-current sources. The frequency is controlled by the amplitude of the bias voltage impressed upon the base electrodes of transistors 94 and 99 via control input connection 114.

In the circuit, terminal 88 connects to a source of —12 v. D.C. supply power. This is decoupled by resistor 89, which has a resistance of 82 ohms and is connected in series from the —12 v. source, and by capacitor 90, which has a capacitance of 100 $\mu$f. and is connected from the load side of resistor 88 and the COM, or ground, terminal.

Transistor 96 is powered from the power supply bus 92 through resistor 91, of 2,200 ohms, to the collector of the transistor. The emitter thereof is connected directly to the COM bus. Transistor 101 is symmetrically connected in the same manner as transistor 96. Both transistors may be of the PNP 2N1305 type. The bases of both transistors are cross-connected to the opposite collectors through capacitors 95 and 100, each having a capacitance of 270 pf.

The collector of constant current transistor 94 is connected to the base of transistor 101 and, symmetrically, the collector of transistor 99 is connected to the base of transistor 96. Transistors 94 and 99 are of the NPN type, as the 2N1304. The emitter of transistor 94 is connected to the —12 v. bus 92 through resistor 93, which resistor has a resistance of 18,000 ohms. The emitter of transistor 99 is similarly connected in a symmetrical circuit with the same resistance value through resistor 98.

The basic frequency of operation of the oscillator is conveniently adjusted by altering the values of resistors 93 and 98, normally in a symmetrical fashion. The frequency thus determined is varied by the voltage impressed upon lead 114, which connects to the bases of both transistors 94 and 99. The voltage-controlled functioning of the oscillator is accomplished through lead 114.

An output circuit for the oscillator is comprised of transistors 110 and 107 and associated circuitry. The output from the collector of transistor 101 is coupled to the base transistor 110 by capacitor 102, having a capacitance of 82 pf. This base is also connected to the —12 v. bus 92 through resistor 104, of 22,000 ohms resistance and also to the COM bus through diode 109, which may be a type 1N658. The emitter of transistor 110 is connected to the COM bus and the collector to the —12 v. bus through resistor 105, of 1,000 ohms resistance. The collector of transistor 110 is also connected to the base of transistor 107 and that base is returned to COM through resistor 111, of 1,800 ohms resistance. Resistors 105 and 111 comprise a voltage divider, with the conductivity of transistor 110 modifying the effective resistance of resistor 111.

The collector of transistor 107 is connected to the —12 v. bus 92 through resistor 106, having a resistance of 120 ohms. Transistor 107 is emitter-follower connected, with resistor 112 connecting the emitter to the COM bus. A resistance of 3,900 ohms is typical for resistor 112. Diode 108, which is of the 1N277 type, is connected with the anode to the base of the transistor and with the cathode of the diode of the emitter of transistor 107. The output of the oscillator is taken from lead 113 and connects to lines 47 and 48 of FIG. 4.

The fundamental multivibrator action of the voltage-controlled oscillator is as follows. The turn-on of transistor 96 causes that side of capacitor 95 that is connected to the collector of transistor 96 to change 11.5 volts in a positive direction. This change of potential is coupled to the base of transistor 101, which was previously at a potential of approximately 0.5 v., this being the turn-on potential of transistor 101. The base of transistor 101 is thus driven 11.0 v. positive, or 11.5 volts below the turn-on potential of transistor 101. The cut-off of current in this transistor thus causes the collector thereof to rise to —12 v. Since capacitor 100 is coupled from the collector of transistor 101 to the base of transistor 96, the fall in potential of the collector of transistor 101 from 0.5 v. to —12 v. charges capacitor 100 to a 11.5 v. differential. This charge current increases the base current of transistor 96 and further insures the turn-on of transistor 96.

The base of transistor 101, which has been driven to +11 v. will fall to —0.5 *volt, the* turn-on point of transistor 101, at a rate depending upon the current available to discharge capacitor 95. When capacitor 95 is fully discharged the base of transistor 101 will have returned to —0.5 v. When this transistor is thus tuned on, the resulting +11.5 volt transition of the collector thereof is coupled to the base of transistor 96 through capacitor 100 and this cuts off transistor 96. The period of this cut-off is determined by the current available to discharge capacitor 100. Thus, transistors 96 and 101 are alternately switched on and off. The turn-on of transistor 96 shuts off transistor 101 and the turn-on of transistor 101 shuts off transistor 96.

The degree of frequency control exercised by constant current source transistors 94 and 99 is determined by the value of emitter resistors 93 and 98. This is because the magnitude of control input voltage relative to —12 volts divided by the effective emitter resistance determines the value of constant current established by transistors 94 and 99.

The output circuit includes transistors 107 and 110. Transistor 110 is normally turned on by approximately 10 milliamperes of current, but when the collector of transistor 101 changes from —12 v. to —0.5 v., the base of transistor 110 is driven to +0.5 v., as limited by diode 109. Thus, transistor 110 is cut off during the positive transition of the collector of transistor 101. The cut-off of transistor 110 allows its collector to rise to a potential set by resistors 105 and 111, acting as a voltage divider from —12 v. to COM (i.e., from —12 v. to ground or zero potential). This causes emitter-follower transistor 107 to drive output line 113 to approximately —6.5 v. Transistor 110 remains cut-off for approximately a half microsecond. This is determined by the transition time of transistor 101 plus the 1 volt discharge time of capacitor 102 and the turn-on delay time of transistor 110. Thus, the output of the voltage-controlled oscillator at 113 is a negative-going pulse of approximately 6.5 volts amplitude and a half microsecond duration and the frequency of occurrence of these pulses is determined by the time to discharge the cross-coupling capacitor through the voltage-controlled constant current source.

The circuit of FIG. 6 is an operational amplifier connected as an integrator; i.e., having an output amplitude proportional to the integral of the input voltage with respect to time. It consists of first differential amplifier having transistors 124 and 125, second differential amplifier having transistors 132 and 137, a third differential amplifier having transistors 144 and 147 and an emitter-follower stage having transistor 141.

The integrator function is achieved by employing capacitors 130 and 139 with resistor 129 shunted across the former as a feedback path from the emitter of transistor 141 to the base of transistor 124. The latter connection acts as a summation point for input resistor 156 of FIG. 7, to which it is connected, and elements 129, 130 and 139.

As has been indicated, the input to the integrator of FIG. 6 comes from resistor 156 of the phase detector of FIG. 7. This is via conductor 115 in FIG. 6. Conductor 115 connects to the base of transistor 124, to one terminal of each of resistor 129, capacitor 130 and variable resistor 120. Transistors 124 and 125 may be of the PNP type 2N1027. Resistor 129 may have a resistance of the order of 3,300 ohms, capacitor 130 a capacitance of 1 $\mu$f. and resistor 120 a maximum resistance of 2 megohms. The latter resistor is a bias-setting adjustment for the amplifier. The second terminal of variable resistor 120 connects to a constant voltage supply bus formed from the —12 v. bus by resistor 114, of 820 ohms resistance, and shunt-connected zener diode 131, which is shunted to the COM bus, and may be of the 1N751 type.

In order to form the first differential amplifier, the emitters of transistors 124 and 125 are connected together and to a common resistor 128, having a resistance of 68,000 ohms and being also connected to the COM bus. The collector of transistor 124 is connected through resistor 121 to the constant voltage bus previously mentioned. An appropriate resistance value for resistor 121 is 22,000 ohms. The collector of transistor 125 is similarly symmetrically connected with resistor 122. The base of transistor 125 is connected to a potentiometer across the constant voltage to COM buses, comprised of resistor 123, potentiometer 126 and resistor 127, having resistances of 820, 1,000 and 2,700 ohms, respectively.

The second transistor pair, 132 and 137, have bases which are connected to the collectors of transistors 125 and 124, respectively. Thus, the differential output of the first pair is impressed upon the second pair of transistors. As before, the emitters of transistors of equivalent type and designation to the first pair are connected together and through a single resistor 138 to the COM bus. Resistor 138 preferably has a resistance of 10,000 ohms. The collectors of transistors 132 and 137 are connected to the −12 v. bus through resistors 133 and 136, respectively, each having a resistance value of 15,000 ohms.

The third transistor pair, 144 and 147, have bases which are connected to the collectors of transistors 137 and 132, respectively. The differential output of the second pair is impressed upon the third pair. Transistors 144 and 147 are of the NPN type, such as the 2N1304. A phase correction circuit comprised of resistor 134 of 150 ohms resistance and capacitor 135 of 0.002 $\mu$f. capacitance is connected between the collectors of transistors 132 and 137 to provide high frequency stabilization of the circuit.

The emitters of transistors 144 and 147 are connected together and to the −12 v. bus through single resistor 148, which has a resistance of 3,000 ohms. The collectors of transistors 144 and 147 are connected to the COM bus through resistors 145 and 146, respectively, each having a resistance value of 12,000 ohms. These transistors are "inverted" with respect to the rest of the circuit because of the NPN construction employed. The collector of transistor 144 is connected to the base of transistor 141 and also to a capacitor 149 and resistor 143 connected in series and to the −12 v. bus. Transistor 141 is preferably of the NPN type, as a 2N1304, while the capacitor has a capacitance of 0.33 $\mu$f. and the resistor a resistance of 390 ohms. This series RC circuit augments the function of resistor-capacitor circuit 134 and 135.

The emitter of transistor 141 connects to the −12 v. bus through resistor 142, of 1,800 ohms resistance, while the collector connects to the COM bus through resistor 140, of 100 ohms resistance.

The feedback connection to accomplish integration connects from the emitter of transistor 141 to capacitor 139, of 10 $\mu$f. capacitance, and that capacitor connects, in turn, to the parallel RC combination 129 and 130, which have been previously described. With the three phase reversals through the three pairs of transistors 124–147 and the lack of phase reversal in an emitter-follower stage (141), it is seen that the feedback through elements 129, 130 and 139 is negative, or degenerative.

This feedback circuit gives integration because current through this path must be equal to current entering input terminal 115. In order for this to be true the voltage at the output of the amplifier must be equal to the time integral of the voltage producing the input current at terminal 115. The negative output from the integrator is taken from the emitter of transistor 141, at lead 117.

In the phase detector of FIG. 7, sampling line 176 is supplied with a 6 volt negative-going pulse of 20 microsecond ($\mu$s.) duration from one-shot output line 320 of FIG. 13. This pulse occurs at a frequency of $F_{vco}/2N$ pulses per second (p.p.s.), where $N=90+F_v$ in tenths of kilocycles. Reference input line 155 connects to the output line 189 of NOR logic block 188 of FIG. 8. Under the condition of an absence of output from one-shot 182 of the frequency detector of FIG. 8, or of one-shot 183 of the same, the waveform upon line 155 is normally a 100 c.p.s. wave. This square wave has voltage levels of either −0.2 v., established by the saturation output voltage of the NOR block 188; or −6.2 v. established by zener diode 178, which connects the line 155 to the COM bus in FIG. 7. During the 20 microseconds that the sampling pulse is applied to line 176, reference input line 155 is given a low resistance connection to output resistor 156 through transistor switches 157 and 158. These transistors are of the PNP type, as the 2N1027. The emitter of transistor 157 is connected to line 155. The collector of the same is connected to the collector of transistor 158. The emitter of transistor 158 is connected to resistor 156, which has a resistance of 2,700 ohms. The second terminal of resistor 156 connects to line 177.

The base of transistor 157 connects to diode 159 and also to resistor 161. The former may be of the 1N658 type and resistor 161 may have a resistance of 5,600 ohms. The base of transistor 158 is symmetrically connected to diode 160 and resistor 162, which elements have the same values as just described. The second terminals of resistors 161 and 162 connect to the center-tapped winding 163 of transformer 152. The center-tap of this winding connects to the junction point of both cathodes of diodes 159 and 160 and to the collectors of both transistors 157 and 158.

Output line 177 connects to the input of the integrator of FIG. 6, at line 115. The integrator output line 117 of FIG. 6 is the voltage control input to the voltage-controlled oscillator of FIG. 5, at line 114.

When the midpoint of the 20 microsecond sampling pulse is coincident with the negative-going transition of the 100 c.p.s. square wave on input line 155, equal amounts of plus and minus signal relative to −3.2 v. are applied to integrator input line 115 of FIG. 6 and no change in the frequency of the voltage-controlled oscillator results. However, if the midpoint of the sampling pulse arrives early in relation to the negative-going transition of the 100 c.p.s. square wave, the plus pulse input to the integrator will be of greater duration than the minus input and the inverted output line 117 of the integrator will change in the negative direction. This decreases the difference in potential between the voltage-controlled oscillator input line 114 of FIG. 5 and the −12 v. bus. This, in turn, decreases the current in the constant current source transistors 94 and 99 and lengthens the period of the voltage-controlled oscillator frequency. This causes the next sampling pulse, which occurs after another N period of the $F_{vco}/2$ frequency, to occur later in time, thus decreasing the time difference between the sampling pulse and the negative-going transition of the 100 c.p.s. square wave reference. A similar but opposite polarity action takes place if the midpoint of the sampling pulse arrives late with respect to the negative-going transition of the 100 c.p.s. square wave.

Further, in the phase detector of FIG. 7, the sampling pulse at input line 176 causes activation of transistor switches 157 and 158 by acting through transistor amplifier 167 and transformer 152. The transistor 167 is preferably of the PNP type, as the 2N1305, while the transformer may be the United Transformer Co. type DO–T37. The collector of the transistor connects to one extremity of primary winding 153 of the transformer through capacitor 164, of 22 $\mu$f., while the emitter of the transistor connects to the other extremity of the primary winding through capacitor 165, also of 22 $\mu$f. capacitance.

Transistor 167 is normally "on" with a collector current of 3 milliamperes (ma.), because of base current supplied from resistors 170 and 173, diode 172 and resistor 174; the nominal voltage of which combination is 3.15 volts. Resistor 170 connects to the −12 v. bus and has a resistance of 6,800 ohms. Resistor 173 connects to resistor 170 and to the COM bus. It has a resistance of 5,600 ohms. Diode 172 connects from the base of transistor 167 to resistor 174, with the cathode of the diode connected to the base. The diode may be of the 1N277 type and resistor 174 has a resistance of 4,300 ohms. The second terminal of this resistor connects to the COM bus.

When the input line 176 is changed from —0.5 v. to —6.5 v., this drives the junction of resistor 174 and diode 172 to —6.0 v. The junction of resistors 170 and 173, and also the base of transistor 167, now changes to —5.5 v., with diode 172 non-conducting and back-biased by 0.5 v. This increases the current in transistor 167 from 3 ma. to approximately 5 ma. This 2 ma. change in current causes the collector of transistor 167 to change 2 volts in a positive direction and the emitter to change 2 volts in a negative direction. This 4 volt pulse is applied to primary 153 and causes secondary 163 to apply negative voltages to the bases of PNP transistor switches 157 and 158. This negative voltage relative to the potential of the collectors forward biases both the base-collector junction and the base-emitter junction, thus placing switches 157 and 158 in conduction.

When the sampling signal at input line 176 returns to —0.5 v. the voltage across resistor 174 decreases, changing diode 172 to a forward biased condition and adding resistor 174 in parallel with resistor 173. This restores the base of transistor 167 to —3.15 v. and opens transistor switches 157 and 158.

Capacitor 169 connects between base and collector of transistor 167. It has a capacitance of only 47 pf. and acts to damp transformer 152 to prevent overshoot of the waveforms associated with it. Resistor 168 is the collector load resistor of transistor 167. It has a resistance of 1,000 ohms and connects from the collector to the —12 v. bus. In a similar manner, resistor 166 connects the emitter of transistor 167 to the COM bus and also has a resistance of 1,000 ohms. Diode 171 connects in the line 176, with its anode connected to resistor 174, and may be of the 1N277 type. Capacitor 175, of 22 $\mu$f. capacitance, connects from the —12 v. bus to the COM bus to accomplish usual power source decoupling.

The frequency detector of FIG. 8 is given in block form for the logic elements involved, with typical schematic circuits given for the blocks in subsequent figures.

The purpose of the frequency detector, being block 8 of FIG. 1, is to detect a difference in frequency between $F_{vco}/2N$ on line 180 of FIG. 8 and the 100 p.p.s. on line 200, also of that figure. If the period $2N/F_{vco}$ seconds is less than 10 milliseconds (ms.), then two $F_{vco}/2N$ pulses are included in some 10 ms. periods. This allows one-shot 182 to be gated "on" by setting flip-flop 181 with the first of the two included pulses, after which one-shot 182 is triggered "on" by the second of the two included pulses. When one-shot 182 is triggered "on" it remains in this condition for one-fourth second.

A —9 volt output of one-shot 182 on line 186 is applied to NOR gate block 188 and causes a —0.2 volt output on line 189. Line 189 connects to reference input line 155 of the phase detector of FIG. 7. For an interval of one-fourth second each sample taken at the $F_{vco}/2N$ frequency by the phase detector finds a plus signal present relative to —3.2 v. and causes the period of the voltage-controlled oscillator to increase. When the period of $2N/F_{vco}$ has increased to 10 ms., two $F_{vco}/2N$ pulses cannot be included in one 10 ms. period and one-shot 182 cannot be triggered "on." The phase detector of FIG. 7 now samples the 100 p.p.s. square wave on line 190, which is passed through NOR gate blocks 184 and 188 and phase-error detection is effective.

In contrast to the above, if the period $2N/F_{vco}$ seconds is greater than 10 ms., then two 100 p.p.s. pulses on line 200 can be included in some $2N/F_{vco}$ second periods. This allows the first of the two included pulses to gate "on" one-shot 183 by resetting flip-flop 181, and the second included pulse to trigger "on" one-shot 183. The one-fourth second —9 v. output from one-shot 183 on line 185 is applied to NOR gate block 184. This causes a —0.2 v. output from NOR gate block 184 on line 187. This, in turn, is applied to NOR gate block 188, which provides a —6.2 v. signal upon line 189 to be impressed upon line 155 of the phase detector of FIG. 7. Then, for an interval of one-fourth second, each sample taken by the phase detector finds a minus signal present relative to —3.2 v. and causes the period of the voltage-controlled oscillator of FIG. 5 to decrease until the period $2N/F_{vco}$ seconds is equal to 10 ms.

When one-shot 182 or one-shot 183 is triggered "on," OR gate block 201 causes lamp 202 to illuminate. This indicates that a frequency correction "tuning" is in progress.

It will be understood that the frequency detector operates for the purpose of bringing the divided local oscillator frequency near the value of the 100 p.p.s. reference frequency. When this has been accomplished the phase control loop has sufficient bandwidth to phase-lock the local oscillator to the reference frequency. This occurs in practical embodiments when the divided local oscillator frequency is within a few cycles per second, such as five, of the reference frequency.

A typical one-shot multivibrator as employed in the frequency detector of FIG. 8 is shown schematically in FIG. 9.

A one-shot is a monostable multivibrator; that is, it has one stable state. When it is triggered the circuit changes state and remains in the changed state for a period of time determined by the discharge of a cross-coupling capacitor. It then returns to its quiescent state and after a suitable recovery time it can be again triggered and will repeat the previously described cycle.

The one-shot of FIG. 9 is in its quiescent state when transistor 225 is conducting and transistor 217 is non-conducting. With the control input line —6 v. or more negative, diode 214 is reverse biased. This prevents trigger pulses on line 230 from being coupled to the base of transistor 217. Also, the relatively small control current through resistor 210 is in itself insufficient to cause triggering, this current being absorbed by resistor 213 and/or diode 215. With control input line 229 at —0.5 v., capacitor 212, of 68 pf. capacitance, has a charge of approximately one volt, with the diode 211 side of the capacitor at —0.5 v. and the diode 214 side at +0.5 v. A 6 volt negative-going transition from —0.5 to —6.5 v. on input line 230 is coupled through diode 214 to the base of transistor 217 and will attempt to drive the base thereof to —5 v. However, as soon as input line 230 has changed by 1.2 v., from —0.5 v. to —1.7 v., the base of transistor 217 begins to conduct. This turn-on of transistor 217 causes the collector thereof to change from —12 v. to —0.5 v. This 11.5 v. positive transition is coupled through capacitor 219, of 22 $\mu$f. capacitance, to the junction of resistor 220 and diode 223. Resistor 220 has a resistance of 15,000 ohms and diode 223 is of the 1N658 type. The cathode of diode 223 is driven from —0.7 v. to +10.8 v. This allows the base of transistor 225 to change from —0.2 v. to +0.2 v., as established by resistor 222 and diode 224. Each of the two transistors in the one-shot are of the PNP type, such as the 2N1499A, and the resistance of resistor 222 is 68,000 ohms.

When the base of transistor 225 is changed from —0.2 v. to +0.2 v. this transistor is turned "off" and its collector changes from —0.5 v. to —11.6 v. This change is applied to the base of transistor 217 through cross-coupling capacitor 227, of 47 pf. capacitance, and supplies additional base current to assist in the turn-on of transistor 217. A voltage divider is composed of resistor 226, of 8,200 ohms, and resistor 221, of 68,000 ohms, and is connected from the collector of transistor 25 to the +12 v. bus. The base of transistor 217 is connected to the junction between these two resistors and the voltage-divider provides base current to hold transistor 217 "on" until the current from the —12 v. bus through resistor 220, of 15,000 ohms, discharges capacitor 219. This causes the cathode of diode 223 to change from +10.8 v. to −0.7 v. in approximately one-fourth second. When the cathode of diode 223 has again reached −0.7 v. transistor 225 is turned "on" through diode 223. At the same time transistor 217 is turned "off" through capacitor 227 and resistor 226 and the circuit has returned to its quiescent state.

Collector load resistors 218 and 288 connect to the collectors of transistors 217 and 225, respectively, and have resistances of 1,200 ohms each. The second terminals of each connect to the −12 v. bus. Diodes 216 and 224, each of the 1N277 type, act as clamps upon the bases of transistors 217 and 225, respectively, being connected from the bases to the COM bus. The output of the one-shot is taken from line 231, while triggering inputs may be impressed upon lines 229 or 230. Diodes 211, 214 and 215 are of the 1N658 type. In the control input circuit, resistor 210 is connected in series in line 229 and has a resistance of 27,000 ohms, while resistor 213 connects from capacitor 212 to the COM bus and has a resistance of 47,000 ohms.

In the OR gate of FIG. 10, transistor 238 is of the PNP type, as a 2N1305. The emitter thereof connects directly to the COM bus, which is an actual or an equivalent ground. The collector of the transistor connects to lamp 241, of the usual low voltage incandescent type and the other terminal of the lamp connects to the −12 v. bus. Resistor 235 connects to the base of transistor 238 and also to the +12 v. bus at the second terminal of the resistor. The resistance value thereof is typically 27,000 ohms. A resistor 236 also connects to the base of transistor 238 and to input lead 241. Resistor 239 similarly connects to the base of the transistor and to input lead 240. Resistors 236 and 239 each have resistance values of 3,900 ohms.

In this OR gate, transistor 238 is turned "on" and is given a low resistance path to ground when input line 240 or input line 241, or both are more negative than −3 volts. This causes lamp 241 to light. Because of this or mode of action the circuit is given the known OR gate designation.

In the typical NOR gate of FIG. 11, transistors 250 is of the PNP type, as a 2N1305. The emitter thereof connects directly to the COM bus. The collector thereof connects directly to output lead 252 and through resistor 255, of 1,200 ohms resistance, to the −12 v. bus for energization. The base of the transistor connects to the +12 v. bus through resistor 251, of 51,000 ohms resistance, and also to plural inputs, as 253 and 254, each input having a series resistor, 245 and 246, respectively. The resistance of these latter resistors is 8,200 ohms each.

A NOR gate is an OR-inverter circuit that is known. It is described in the book, "Digital Computer & Control Engineering," by Robert S. Ledley, p. 672, par. 20–6, published by McGraw-Hill.

Two NOR gates, like the single one shown in FIG. 11 are employed in the frequency detector of FIG. 8; one being in block 184 and the other in block 188.

In the schematic circuit of FIG. 11, the application of a −6 v. signal to input line 253 or 254, or both, will cause transistor 250 to conduct and to produce a −0.5 v. output signal on output line 252. When both lines 253 and 254 are at a potential of −0.5 v., then the output line 252 is at −12 v. in the absence of an external load. When current is drawn from the gate, as upon the connection of an external load, the −12 v. output voltage is reduced by 1.2 v. for each milliampere of external load current in a typical embodiment of our invention.

The digital divider section shown in FIG. 12 establishes a ratio "N" between $F_{vco}/2$ and 100 pulses per second. The digital divider consists of flip-flops 281 through 284, with diodes 286 and 287, connected to divide by 10 as a "tenths kilocycle" counter; flip-flops 301 through 304, with diodes 306 and 307, connected to divide by 10 as a "units kilocycle" counter; and flip-flops 461 through 464, with flip-flop 469 additionally, and diodes 466 and 468, connected to divide by 11 as a "tens kilocycle" counter. These three units together form a divide-by-1100 circuit that counts to tenths of kilocycles.

The division ratio N is produced to equal 90 plus $F_v$, where $F_v$ is the frequency in *tenths* of kilocycles, of the signal to be selectively amplified. The ratio N is established by pre-setting the tenths kilocycle, units kilocycle, and tens kilocycle counters to the 9's complement of the value of $F_v$ as expressed in tenths of kilocycles. After a delay time of approximately two microseconds a count of one is then added to the tenths kilocycle counter, and after an additional delay of approximately two microseconds a count of one is added to the units kilocycle counter.

The counter as a whole is now preset to a number $=999-F_v+11$, which is $=1010-F_v$. Since the digital divider is a divide by 1100 circuit, a total of $$1100-(1010-F_v)$$

which $=90+F_v$, pulses of energy are required to cause an output from the counter. When $90+F_v$ pulses of $F_{vco}/2$ have occurred the counter output again presets the counter to $1010-F_v$ and commands a phase comparison between the 100 p.p.s. reference frequency and the $F_{vco}/2N$ frequency represented by output line 472 of the counter.

Pre-setting the digital divider counter to the 9's complement of $F_v$ is accomplished by simultaneously pulsing auxiliary "set" or "reset" inputs of each flip-flop in the counter. That is, in the tenths kilocycles decade of FIG. 12, the "DCS" stands for "direct-current set," "ACS" stands for "alternating-current set," "ACR" stands for "alternating-current reset" and "DCR" stands for "direct-current reset."

It is to be noted that the tenths kilocycles decade thumbwheel switch 288 in FIG. 12 has eight contact wires 291 through 298 connecting to it, and one common lead 299. By referring to FIG. 15 it is noted that lines 291 through 298 connect to switches 526 through 533 and that these lines and switches are weighted according to digital terminology; as 1, 2, 4, 8, $\bar{1}$, $\bar{2}$, $\bar{4}$, $\bar{8}$, respectively. In the tenths kilocycle decade (the top one) in FIG. 12, these lines and switches are connected as follows to accomplish the presetting function.

Line 291 connects to DCS of flip-flop (FF) 281. Line 292 connects to DCS of FF284. Line 293 connects to DCS of FF283. Line 294 connects to DCS of FF282. Line 295 connects to DCR of FF282. Line 296 connects to DCR of FF283. Line 297 connects to DCR of FF284. Line 298 connects to DCR of FF281.

Line 299 is the common, COM, connection and it persists as a metallic connection regardless of the position of the thumbwheel in switch 288.

Further, in FIG. 12, line 280 is the input to the tenths kilocycles decade. This connects to line 391 of FIG. 13, which carries the frequency $F_{vco}/2$. Line 280 connects to both ACS and ACR of FF281. The output of this flip-flop connects to the ACR of FF282 and also to the cathode of diode 287. The anode of this diode connects to the ACS of FF282 and also to the anode of diode 286, the cathode of which connects to the output line 290 for this decade. The output of flip-flop 282 connects to both the ACS and ACR of FF283. The output of flip-flop 283 connects to the ACS of FF284. The output of FF281 connects to the ACR of FF284 in addition to the other connections previously recited. The output of flip-flop 284 is also connected to the output line 290 for the decade.

Steering of pulses to the above "set" and "reset" points in each flip-flop as required for a specific dividing ratio is accomplished by the pulsing line 534 in FIG. 15 acting through the appropriate contacts of electromechanical selector 525. In the present equipment this is comprised of three thumb-wheel switches 288, 308 and 465 of FIG. 12. Tabular FIG. 16 indicates how these contacts are in either the open or the closed state for manual operation of one thumb-wheel from digits 0 through 9.

In the tenths and the units kilocycles decades, characterized by thumbwheel assemblies 288 and 308, diodes 286 and 287, and 306 and 370, respectively, perform the functions of modifying the counting process if the divider is such that the maximum count is 10 rather than 16.

In the tens kilocycle decade of 465 the circuit is different, as to diodes 466 and 468 and also because of the additional flip-flop 469. In being connected to the output of FF461 and to the output of FF462, respectively, these diodes, being also connected to the ACR input of flip-flop 464 cause this counter to count by 11. Flip-flop 469 is direct-current set or direct-current reset by the tens kilocycles switch 465. This selects the proper one of the initial stages filters; i.e., in the illustrative embodiment, the band 12 to 20 kc. or the band 20 to 30 kc.

The other flip-flops 461 through 464 are connected to the thumbwheel switch 465 in the same way as corresponding flip-flops are connected to switch 288. Additionally, the DCS and the DCR connections for FF462 are duplicated for flip-flop 469, as inputs thereto.

The output lines 470 and 471 of FF469 provide the output to select the proper filter to put in circuit in band pass filter amplifier 2 of FIG. 1. Which one of the two filters mentioned above that is electrically switched in circuit is determined by the setting of the three decades of thumbwheel switches, as interpreted by flip-flop 469 at output lines 470 and 471. These lines are connected to block 2. Within the tens kilocycle decade 456 of FIG. 12, the voltage pulses fed through the digital switches which reset the counter to a number $$999-F_v+11=1010-F_v$$

are the ones which are also used to select the appropriate band-pass filter in block 2.

FIG. 4 gives the typical schematic circuit for each of the flip-flops of FIG. 12; i.e., flip-flops 281–284, 301–304, 461–464 and 469. The counters of FIG. 12 are preset to the proper number when an overflow of the counters occurs.

The necessary delays and driving circuitry to control the flip-flops of FIG. 12 is provided by the circuitry of FIG. 13. The operation of the elements of this figure are set forth below.

The output of the tens kilocycle counters, which indicate that the counters have accumulated their maximum count, enters FIG. 13 on line 338 and triggers the one-shot multivibrator 417. An output thereof, which is 20 $\mu$s. in duration, leaves the circuit on line 320 and is used to sample the phase detector switch of FIG. 7, as has been previously described. Another output of one-shot 417 is shaped by shaping circuit 418 into a 1 $\mu$s. pulse and leaves the circuit on line 339. This pulse is used to reset the three decade counters through the decimal switches to the 9's complement of the number indicated by the switch dials. This pulse is also used internal to the circuit. It is delayed 2 $\mu$s. by delay circuit 419 and is supplied to the line 391 through diode OR gate 424. This OR gate drives the first $N/10$, or tenths kilocycle counter of FIG. 12. This pulse advances the count preset in the counters by one count, or one-tenth kilocycle.

The above-delayed pulse is delayed an additional 2 $\mu$s. by delay circuitry 420 and applied to a similar diode OR gate 421 and out on line 404. This OR gate drives the second $N/10$, or units kilocycle counter. This pulse advances the count preset in the counters by ten counts, or one kilocycle.

It is to be noted that the complete process of presetting and adding pulses to the counters is accomplished between successive cycles of the $F_{vco}/2$ frequency. The $F_{vco}/2$ signal from the $N/2$ divider enters the digital divider of FIG. 12 through the inverter and shaping circuit 423 and the diode OR gate 424 of FIG. 13.

The tenths and units counters of FIG. 12 are connected through the inverter and shaping circuit 422 and diode OR gate 421 of FIG. 13. It is seen that these gating arrangements allow both the addition of pulses to the counter after presetting and the normal counting of the $F_{vco}/2$ signal.

FIG. 14 gives the schematic diagram for a one-shot and divider logic to control the digital divider of FIG. 12. Transistors 326 and 347 in FIG. 14 and associated elements comprise a one-shot multivibrator, which device was described as to circuit and function in connection with FIG. 9. These elements will now be described only insofar as they coact with the additional elements of FIG. 14.

In FIG. 14 an output from the one-shot is provided by emitter-follower transistor 323. This may be of the PNP type, such as the 2N1499A, as may all of the transistors in FIG. 14. An output is taken from the one-shot by a direct connection from the collector of transistor 326 to the base of transistor 323. Between this base and the COM bus is connected resistor 325, having 2,700 ohms resistance. The collector of transistor 323 is connected to the −12 v. bus through resistor 322, of 220 ohms. A filter by-pass capacitor 321 for general isolation, of 2 microfarads capacitance, is connected between the −12 v. bus and the COM bus. The emitter of transistor 323 is connected to the COM bus through resistor 324, which has a resistance of 4,700 ohms. A one-shot output at the relatively low impedance of an emitter-follower is available at lead 320, which lead is taken from the emitter of transistor 323. A diode 327 connects between the collector of transistor 326 and the emitter of transistor 323 to permit line 320 to supply currents in both positive and negative directions. The output on line 320 is employed to provide the reference input line 176 of FIG. 7, the phase detector, with a necessary signal.

A 100 p.p.s. trigger from the output of the tens $N/11$ divider is applied on lead 338 to trigger the whole apparatus of FIG. 14. This is also shown in FIG. 13. The trigger signal is fed through capacitor 335, of 47 pf. capacitance; thence to the cathode of diode 334, to resistor 337 and to resistor 336. The former resistor has a second terminal which is connected to the COM bus, while the latter resistor, of 100,000 ohms resistance, has a second terminal which connects to the +12 v. bus. The anode of diode 334 connects to the base of transistor 347 and also to the first terminal of resistor 333, the second terminal of which connects to the +12 v. bus. Resistor 333 has a typical resistance of 70,000 ohms.

An additional output is taken from the apparatus of FIG. 14 by employing transistors 349 and 352. An output is taken from the one-shot proper by capacitor 346, connected from the collector of transistor 347 to the base of transistor 349. This base is also connected to the −12 v. bus through resistor 342, which resistor has a resistance of 22,000 ohms. The emitter of transistor 349 is connected directly to the COM bus. The collector is connected to the −12 v. bus through resistor 350, of 2,200 ohms resistance and also to the COM bus through resistor 348, of 2,700 ohms resistance, forming a voltage divider.

The collector of transistor 349 is directly connected to the base of transistor 352. The latter is an emitter-follow transistor and the emitter is returned to the COM bus through resistor 354, of 4,700 ohms resistance. The collector of transistor 352 connects to the −12 v. bus through resistor 351, having a resistance of 220 ohms. The base and emitter of transistor 352 are connected to the anode and the cathode of diode 353, respectively, to permit line 339 to supply currents in both the positive and the negative directions. Line 339 connects directly to the emitter of transistor 352 and the output on this line is employed for reset driving by connecting to line 534 of FIG. 15, the thumbwheel switch group of elements.

Another output is taken from the emitter of transistor 352 via capacitor 355, of 100 pf. capacitance, which also connects to the base of transistor 364. This base is also connected to the −12 v. bus through resistor 356, having a resistance of 22,000 ohms. The collector thereof also connects to the −12 v. bus through resistor 357, of 4,700 ohms resistance. The emitter of transistor 364 connects directly to the COM bus. The signal is further conveyed from the collector of transistor 364 to the base of transistor 362 via capacitor 361, of 100 pf. capacitance. This base is also connected to the −12 v. bus through resistor 358, of 22,000 ohms resistance. The collector of transistor 362 is also connected to the −12 v. bus via resistor 359, of 2,200 ohms resistance. The emitter is connected directly to ground; that is, to the COM bus.

The collector of transistor 362 is directly connected to the base of transistor 363, an emitter-follower connected transistor. The collector of the latter transistor is connected to the −12 v. bus through resistor 360, of 120 ohms resistance, while the emitter is connected to the COM bus through resistor 367, of 4,700 ohms resistance. The anode of diode 366 is connected to the base of transistor and the cathode is connected to the emitter of the transistor.

Transistors 364, 362 and 363 act to produce a pulse of approximately 1 microsecond duration on line 391 which is delayed from the pulse applied to line 339 by approximately 2 microseconds. The emitter of transistor 363 also connects to the cathode of diode 389, the anode of which connects to lead 391. This lead provides an output that adds one to the tenths kilocycle decade counter.

The emitter of transistor 363 is connected to the base of transistor 369 through capacitor 368, of 100 pf. capacitance. This base is also connected to the −12 v. bus through resistor 371, of 22,000 ohms resistance. The collector thereof is also connected to the −12 v. bus, and through resistor 372, of 4,700 ohms resistance. The emitter of transistor 369 is connected directly to the COM bus. The collector of transistor 369 is connected to the base of transistor 376 through capacitor 370, of 100 pf. capacitance. This base is also connected to the −12 v. bus through resistor 373, of 22,000 ohms resistance. The collector thereof is also connected to the −12 v. bus, through resistor 374, of 2,200 ohms resistance. The emitter of transistor 369 is connected directly to the COM bus. The collector of transistor 376 is also connected directly to the base of transistor 377 and to the COM bus through resistor 378, of 3,000 ohms resistance. Resistors 374 and 378 comprise a voltage divider between the −12 v. and the COM buses. The collector of transistor 377 is connected to the −12 v. bus through resistor 375, of 220 ohms resistance, while the emitter thereof connects to the COM bus through resistor 379, of 4,700 ohms resistance, making this an emitter-follower connected transistor.

Transistors 369, 376 and 377 act to produce a pulse of approximately 1 microsecond duration which is delayed from the pulse applied to line 391 by approximately 2 microseconds. The lead 391 connects to the tenths kilocycle decade counter, while the emitter of transistor 377 also connects to the cathode of diode 403, the anode of which connects to lead 404. The output on lead 391 adds one to the tenths kilocycle counter, while the output on lead 404 adds one to the units kilocycle counter, to which it is connected.

On line 380 in FIG. 14 an input from the $N/2$ digital divider of FIG. 4 is received, this being the $F_{vco}/2$ output therefrom. This passes through capacitor 381, of 100 pf. capacitance, and to the base of transistor 384. This base is also connected to the −12 v. bus through resistor 382, of 22,000 ohms resistance. The emitter of this transistor is connected directly to the COM bus. The collector is connected to the −12 v. bus through resistor 383, of 2,200 ohms resistance. The collector is also connected directly to the base of transistor 387 and to one terminal of resistor 385, of 2,700 ohms resistance, the other terminal of which is connected to the COM bus. The collector of transistor 387 is connected to the −12 v. bus through resistor 386, of 220 ohms resistance. Transistor 387 is connected as an emitter-follower, having resistor 319 connected from the emitter to the COM bus. Resistor 319 has, typically, a resistance of 4,700 ohms.

Also connected to the emitter of transistor 387 is the cathode of diode 388, the anode of which connects to the COM bus through resistor 390, of 4,700 ohms resistance. The anode also connects to output lead 391, which supplies drive to the $N/10$ tenths kilocycle counter, and through connection to the anode of diode 389 to the emitter of transistor 363 of the part of this FIG. 14 that has already been described. This arrangement of diodes allows $F_{vco}/2$ pulses and delayed 100 p.p.s. pulses to be applied to line 391.

Lead 392, from the divided output of the tenths counter, connects to capacitor 393 of 100 pf. capacitance and thence to the base of transistor 396, which also connects to the −12 v. bus through resistor 394, of 22,000 ohms resistance. The emitter of transistor 396 connects directly to the COM bus, while the collector connects to the −12 v. bus through resistor 395 of 2,200 ohms resistance. The collector also connects directly to the base of transistor 399, which is emitter-follower connected. The base of transistor 399 also connects to resistor 397, of 2,700 ohms resistance and the second terminal of that resistor connects to the COM bus; forming, with resistor 395, a voltage divider from −12 v. to COM. The collector of transistor 399 connects to the −12 v. bus through resistor 398, of 220 ohms resistance. The emitter thereof connects to the COM bus through resistor 401, of 4,700 ohms resistance, and also to the cathode of diode 400, the anode of which connects to the COM bus through resistor 402, of 4,700 ohms resistance, and to the output lead 404. This lead also receives an output from diode 403, as has been previously described, which output advances the units counter of FIG. 12 by the delayed pulse from transistor 377 and diode 403.

FIG. 15 shows the schematic diagram for one thumbwheel switch, a total of three being used in this illustrative embodiment, as indicated at 288, 308 and 465 in FIG. 12. Each switch may be of the printed circuit type with multiple contacts, such as the EECoSWITCH type 24S–110–03. The thumb wheel, or dial indicator, 525 has ten detented positions, labelled 0 to 9. In each of these positions certain contacts are made and certain contacts are not made; i.e., are open circuits. The switches or contacts per se are shown in FIG. 15 as switches 526 through 533. Each has a designated weighting, as 1, 2, 4, 8, $\bar{1}$, $\bar{2}$, $\bar{4}$, $\bar{8}$. At the left side of FIG. 15 it is seen that all of the switch circuits are connected to one lead 534. As has been previously mentioned, this lead connects to lead 339 of FIG. 13 for pulse energization. The several weighted switches connect to the several flip-flops of FIG. 12 as has been previously indicated.

FIG. 16 shows which of the weighted contacts of FIG. 15 are closed for each position of thumbwheel 525. For example, in position 4 the COM or common is always closed, but switch contacts 1, 4, $\bar{2}$, $\bar{8}$ are the specific contacts closed. The others are open-circuited, as indicated by the lack of a black dot in the table. It will be noted that the contact-closed configuration is different for each position of the thumbwheel from 0 to 9.

FIG. 17 shows the schematic circuits of the filter input amplifier, a typical filter and the filter termination apparatus amplifier. These are al parts of the band pass amplifier block 2 of FIG. 1, which also typically includes one additional filter for passing the second pass band of the whole frequency band capable of being received by the receiver. The second filter is typically a duplicate of the first, save for the values of the components and thus has not been detailed.

The signal input, as $F_v$ from antenna 1 in FIG. 1 enters FIG. 17 at lead 540. From there it passes through capacitor 541, of 2.2 microfarads capacitance and through resistor 542 of 68 ohms resistance to the emitters of NPN transistors 543 and 544, which may be of the 2N1304 type. These emitters have a common resistive impedance 545, of 3,900 ohms resistance, and an additional resistance 546, of 3,900 ohms resistance, which connects in series therewith and to the −12 v. bus. The base of transistor 543 is connected to the junction between resistors 545 and 546 by resistor 547, which latter resistor has a resistance of 22,000 ohms. The base of transistor 544 is similarly connected by means of resistor 548, which also has a resistance of 22,000 ohms.

The manner of switching in and out the filters number 1 or number 2 shown, will now be considered. Upon lead 555, which connects to line 471 from FIG. 12 an enabling pulse is supplied when the transmitter frequency chosen by the set of thumbwheel switches lies within the pass band of filter number 1. This passes through resistor 556, of 22,000 ohms resistance, to the base of transistor 543. Capacitor 557 connects from this base to th COM bus and may have a capacitance of 2.2 microfarads. Resistor 556 and shunt-connected capacitor 557 provide noise filtering for the input control line 555. The resistor is in series with the line and has a resistance of the order of 22,000 ohms, while the capacitor connects between the base of transistor 543 and COM and has a capacitance of 2.2 microfarads.

The collector of transistor 543 of the input amplifier is connected to resistor 558, which has a resistance of 1,000 ohms and the second terminal of which connects to the COM bus. This collector also connects to the input of filter number 1; that is, to inductor 559. An equivalent circuit connects filter number 2, element 560, to the collector of transistor 544 and to resistor 561. Filter select line 562 connects to line 470 in FIG. 12 and to the base of transistor 544 through resistor 563, of 22,000 ohms, as before. Capacitor 564, of 2.2 microfarads capacitance, connects the base of transistor 544 to the COM bus. Capacitor 565 connects from the junction between resistors 545 and 546 to the COM bus and has a capacitance of 22 microfarads.

Turning now to filter number 1, variable inductor 559 has an inductance range such that it can be resonated with capacitor 567 at 15.5 kilocycles in this illustrative filter having a pass band of from 12 to 20 kilocycles. Capacitor 567 has a capacitance of 8,200 pf., and the inductor may have approximately 270 turns of approximately #30 wire. A known ferrous tuning slug is used to accomplish the variation of inductance. Capacitor 567 also connects to a tap at typically 146.5 turns from the right end of inductor 568, at the extreme left end of which inductor capacitor 569 connects to it and to the COM bus.

All of the inductors have the same inductance as inductor 559 and all of the capacitors have the same capacitance as capacitor 567. The right end of inductor 568 connects to the COM bus and at a right-hand tap approximately 89 turns from the right end of the coil a second tap is taken and is connected to one end of inductor 570. Capacitor 571 is in series therewith, as was capacitor 567 in series with inductor 559. The connections of inductor 568 and capacitor 569 are repeated with inductor 572 and capacitor 573, save that the capacitor is connected to the right-hand end of the inductor. Capacitor 571 connects to the left tap of inductor 572 and the right tap thereof connects to series inductor 574. Capacitor 575 is in series with inductor 574 and it also connects to the filter output bus 577.

It is also to be noted that the output of filter number 2 connects to bus 577. Thus, there are separate input paths but a common output path.

Connection 577 connects directly to the emitter of transistor 578, which is of the PNP type, as the 2N1499A. Connection 577 also connects to the COM bus through resistor 579, of 560 ohms resistance. The collector of transistor 578 connects directly to the base of transistor 580, the latter being of the NPN type, as a 2N1304. The collector of transistor 578 further connects to resistors 581 and 582, which are connected in series to the −12 v. bus. Each has a resistance of 1,500 ohms. The junction between the two resistors is connected to capacitor 583, the other terminal of which connects to the COM bus. Capacitor 583 has a capacitance of 22 microfarads. The junction between resistors 581 and 582 also connects to resistor 584, of 22,000 ohms resistance, and therethrough to the base of transistor 578. This base is also connected to resistor 585, the second terminal of which connects to the COM bus. Thus, resistors 584 and 585 establish a voltage-divider for the base. The resistance of resistor 585 is 6,800 ohms. The base of transistor 578 is also bypassed to the COM bus by capacitor 586, of 2.2 microfarads capacitance.

The emitter of transistor 580 is connected to the −12 v. bus through resistor 587, of 1,500 ohms resistance. The emitter is bypassed to the COM bus by capacitor 588, of 22 microfarads capacitance. The collector of transistor 580 is connected to resistor 589, of 100 ohms resistance, and the second terminal of this resistor returns to the emitter of transistor 578. A signal output lead 590 connects also to the emitter of transistor 580, which passes the $F_v$ signal to mixer 3 of FIG. 1.

The above terminating amplifier has a very low input impedance so that the two filters can be terminated at the input without causing undesirable interactions between them.

Returning to FIG. 1 to complete the description of the receiver, modulator and servo amplifier 12 receives phase error information from phase detector 11 and produces an alternating current suited to drive phase summer 13. The latter may be an electromechanical device which includes a motor. Amplifier 12 generates an alternating current of suitable amplitude and phase to rotate the motor in one direction or the other in order to bring the divided frequency waveforms from divider 14 into exact frequency and phase correspondence. These waveforms are derived from crystal oscillator 16 and from the incoming transmitter frequency $F_v$ as divided down in frequency to the order of 100 p.p.s.

The portion of the receiver system described above has a bandwidth of only a few thousandths of one cycle per second. This gives an improved signal to noise ratio to the receiver.

From divider 14 lead 18 represents plural separate leads upon which stabilized output frequencies of 100 kc., 10 kc., 1 kc. and 100 cycles per second appear for use as receiver outputs. The accuracy of these frequencies is of the order of 1 part in $10^{11}$. The frequency of crystal oscillator is normally 100 kc.

It will be understood that while the illustrative example given herein of a receiver suited to receive very low frequency transmissions, as for exact time determination by phasing into the carriers of such transmitters, the general system of tuning disclosed may be employed at selected higher frequencies, even to the ultra-high frequency range. At higher frequencies the three thumbwheels used herein would allow only certain frequencies to be received, which frequencies would be distributed uniformly throughout the reception band chosen. However, by increasing the number of thumbwheel switches to 5, 6, etc. greater fineness of tuning is accomplished. The increase in the number of thumbwheel switches follows mere duplication, with additional flip-flops provided according to FIG. 12, and so on.

Also, although decade digital divider circuitry has been described and illustrated herein as elements desirably coactive with the decade thumbwheel switches, it is not necessary to so limit the circuitry or the contact arrangement of the switches. It is merely necessary that the circuitry include counters and these counters may count to any total other than ten for this modification of our invention.

It will also be understood that we have disclosed a method and means for electrically automatically selecting band-pass filters for a receiver by combining this function with digital tuning of the receiver.

Since the circuitry of this receiver does not involve reactive tuning, but does involve accurate phase comparison at the positive-going crossing of the axis of the transmitter carrier frequency with a locally adjusted frequency it is always possible to bring the receiver into exact tune with what it was on a previous tuning to the same transmitter. This is particularly valuable in maintaining exact time as the prime objective at the receiving station.

Although specific examples of voltages, currents and values for resistors, capacitors and inductors have been given in this specification it is to be understood that these are by way of example only, and that reasonably wide departures can be taken therefrom without departing from the inventive concept. Also, modification of the circuit elements per se, details of circuit connections and certain minor alterations of the coactive relation between elements ma yalso be taken under this invention.

Having thus fully described our invention and the manner in which it is to be practiced, we claim:

1. The method of receiver tuning which includes the steps of:

(*a*) receiving a transmitted carrier frequency, (*b*) generating an on-off waveshape at said receiver that is related to said transmitted carrier frequency by a fixed increment of frequency, (*c*) mixing said transmitted carrier frequency and said on-off waveshape to produce phase inversions of said transmitted carrier frequency during alternate half-cycles on said on-off waveshape, (*d*) digitally dividing said on-off waveshape by a number N to produce a first given frequency, which first given frequency is a lower frequency than the frequency of said on-off waveshape, (*e*) forming a second given frequency proportional to said transmitted carrier frequency by employing said mixed transmitted carrier frequency and said on-off waveshape, (*f*) comparing the phase of said first and said second given frequencies, and (*g*) adjusting the phase of said on-off waveshape as a result of said comparison to phase-lock said on-off waveshape to the phase of said transmitted carrier frequency.

2. The method of claim 1 in which (*a*) said fixed increment of frequency is an intermediate frequency, and performing the additional step (*b*) of amplifying at said intermediate frequency the energy resulting from mixing said carrier frequency and said on-off waveshape.

3. In a superheterodyne radio receiver having an intermediate frequency amplifier means for accurately tuning to both the frequency and phase of any one of a plurality of transmitter frequencies comprising (*a*) a digital frequency divider, (*b*) means controlled externally of said radio receiver circuit for setting the division ratio of said divider proportional to a selected one of said transmitter frequencies plus the frequency of operation of said intermediate frequency amplifier, (*c*) a voltage-controlled oscillator, (*d*) a phase comparator switch mixer having a pair of semiconductor devices to periodically reverse the phase of said selected one of said transmitter frequencies, (*e*) a phase detector, and (*f*) an integrator, (*g*) said voltage-controlled oscillator connected to said mixer and to said digital divider, and (*h*) said phase detector and said integrator connected between said digital divider and said voltage-controlled oscillator, (*i*) the recited configuration constituting a receiver tuning means to adjust the frequency of said voltage-controlled oscillator, (*j*) whereby an output is obtained from said mixer that is proportional in frequency and is exactly in phase with the frequency and phase of the selected one transmitter frequency.

4. The radio receiver of claim 3 in which, substitutionally, for paragraph (*b*);

(*a*) said division ratio is set proportional to a selected one of said transmitter frequencies minus the said frequency of operation of said intermediate frequency amplifier.

5. In a radio receiver having a first mixer, means for accurately tuning said receiver to any one of many transmitter frequencies comprising (*a*) plural externally operable multiple contact digital switches connected for the selection of a transmitter frequency, (*b*) servo loop means connected to said first mixer for the adjustment by the output thereof of means to supply a pulse waveform having a frequency of pulse repetition F that is a small fraction of any of the said transmitter frequencies, (*c*) a digital divider, (*d*) means to connect said digital switches to said digital divider to set a given division ratio N in said digital divider, (*e*) a voltage-controlled oscillator, (*f*) a frequency detector, (*g*) a phase detector, and (*h*) an integrator, (*i*) said frequency detector connected to said digital divider and to said servo means to receive an output from said digital divider a pulse waveform having frequency $F_2$ and a pulse waveform of repetition frequency F from said servo means, (*j*) said phase detector connected to said digital divider, and to said servo means to receive an output from each and to said frequency detector to receive an output therefrom until the frequency $F_2$ of said pulse waveform approaches frequency F, thereafter forming an output therefrom proportional to the phase difference between the waveforms of pulses of repetition frequency F from said digital divider and said servo means, (*k*) said integrator connected to said phase detector to form a direct current which is the time integral of said phase difference, (*l*) said integrator connected to said voltage-controlled oscillator to alter the frequency of said voltage-controlled oscillator in accordance with the amplitude of said direct current, (*m*) said voltage-controlled oscillator connected to said digital divider and to said first mixer to provide a local oscillator frequency to said first mixer, (*n*) whereby said pulse waveform of frequency $F_2$ is accurately set to frequency F by the selected said transmitter frequency.

6. The radio receiver of claim 5 in which (*a*) said voltage-controlled oscillator is a relaxation oscillator producing a square wave, and (*b*) said first mixer is a switching circuit actuated by said square wave to provide alternate half-cycles of said transmitted frequency at reversed polarity.

7. The radio receiver of claim 5 in which (*a*) said frequency detector, said phase detector and the input of said integrator accept pulse waveforms, and (*b*) the operation of the recited elements is controlled by the timing of the pulses of said pulse waveforms.

8. The radio receiver of claim 5 in which said digital divider includes (*a*) a plurality of flip-flops and diodes connected to provide a division ratio between said frequency F and the transmitter frequency selected by manipulating said digital switches to read the said transmitter frequency chosen.

9. The radio receiver of claim 5 in which said digital divider includes (a) a plurality of flip-flops and diodes connected as counters to provide a division ratio between said frequency F and the transmitter frequency, which ratio includes an increment equal to the intermediate frequency of amplification of said servo loop means as selected by manipulating said digital switches to read the said transmitter frequency chosen.

10. The radio receiver of claim 5 in which said digital divider includes (a) a plurality of flip-flops and diodes connected in groups of at least two decades to provide a division ratio between said frequency F and the transmitter frequency selected by manipulating said digital switches, (b) whereby the counters of said digital divider are preset to the complement of the desired division ratio number.

11. The radio receiver of claim 5 including additionally (a) at least two band pass filters having pass bands and connections to the same multiple contacts upon said digital switches;

(b) said band pass filters and said contacts connected to connect that one of said band pass filters having a pass band which contains the transmitter frequency to which said switches have been set for receiver tuning, (c) to insert said one band pass filter between the source of transmitter frequency energy for said receiver and said first mixer.

References Cited by the Examiner

UNITED STATES PATENTS

| | | | |
|---|---|---|---|
| 2,595,608 | 5/52 | Robinson et al. | 331—11 X |
| 2,678,347 | 5/54 | Clothier | 328—155 X |
| 2,743,362 | 4/56 | Leed | 331—11 X |
| 2,854,579 | 9/58 | DeVrijer | 331—23 X |
| 3,117,280 | 1/64 | Palmer | 328—155 X |
| 3,130,376 | 4/64 | Ross | 331—18 |

FOREIGN PATENTS

| | | |
|---|---|---|
| 839,422 | 6/60 | Great Britain. |

DAVID G. REDINBAUGH, *Primary Examiner.*

STEPHEN W. CAPELLI, *Examiner.*